US011084147B2

(12) United States Patent
Conrad et al.

(10) Patent No.: US 11,084,147 B2
(45) Date of Patent: *Aug. 10, 2021

(54) POWER TOOL OPERATION RECORDING AND PLAYBACK

(71) Applicant: MILWAUKEE ELECTRIC TOOL CORPORATION, Brookfield, WI (US)

(72) Inventors: Cole A. Conrad, Wauwatosa, WI (US); Thomas G. Simeone, Milwaukee, WI (US); Matthew J. Mergener, Mequon, WI (US); Matthew P. Wycklendt, Madison, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/722,612

(22) Filed: Dec. 20, 2019

(65) Prior Publication Data

US 2020/0125079 A1    Apr. 23, 2020

Related U.S. Application Data

(63) Continuation of application No. 16/414,587, filed on May 16, 2019, now Pat. No. 10,556,330, which is a
(Continued)

(51) Int. Cl.
*G05D 23/00* (2006.01)
*B25B 21/00* (2006.01)
(Continued)

(52) U.S. Cl.
CPC .............. *B25B 21/00* (2013.01); *B25B 21/02* (2013.01); *B25B 23/1475* (2013.01);
(Continued)

(58) Field of Classification Search
CPC ...... H02P 6/08; H04W 4/029; G06F 11/3062; B25B 23/147; B25B 21/00;
(Continued)

(56) References Cited

U.S. PATENT DOCUMENTS 3,882,305 A   5/1975 Johnstone
4,545,106 A   10/1985 Juengel
(Continued)

FOREIGN PATENT DOCUMENTS

DE    10029132    1/2002
DE    202006014606    1/2007
(Continued)

*Primary Examiner* — Tuan A Vu
(74) *Attorney, Agent, or Firm* — Michael Best & Friedrich LLP

(57) ABSTRACT

Systems and methods of operating power tools. The method includes receiving a command to start a recording mode at a first electronic processor of a first power tool, and receiving at the first electronic processor, a measured parameter from a sensor of the first power tool while a first motor of the first power tool is operating. The method also includes generating a recorded motor parameter by recording the measured parameter, on a first memory of the first power tool, when the first power tool operates in the recording mode, and transmitting, with a first transceiver of the first power tool, the recorded motor parameter. The method further includes receiving the recorded motor parameter at an external device, transmitting the recorded motor parameter to a second power tool via the external device, and receiving the recorded motor parameter via a second transceiver of the second power tool.

20 Claims, 26 Drawing Sheets

Related U.S. Application Data continuation of application No. 15/267,571, filed on Sep. 16, 2016, now Pat. No. 10,345,797.

(60) Provisional application No. 62/220,627, filed on Sep. 18, 2015.

(51) Int. Cl.
  *B25B 23/147* (2006.01)
  *G05B 19/425* (2006.01)
  *B25B 21/02* (2006.01)
  *G05B 19/423* (2006.01)

(52) U.S. Cl.
  CPC .......... *G05B 19/425* (2013.01); *G05D 23/00* (2013.01); *G05B 19/423* (2013.01); *G05B 2219/36494* (2013.01)

(58) Field of Classification Search
  CPC ... B25B 23/1475; B25B 21/02; B25B 19/423; G06Q 50/28; G05B 19/425; G05D 23/00
  See application file for complete search history.

(56) References Cited

U.S. PATENT DOCUMENTS

| | | | |
|---|---|---|---|
| 4,680,862 A | 7/1987 | Wieland et al. |
| 4,685,050 A | 8/1987 | Polzer et al. |
| 4,854,786 A | 8/1989 | Alexander et al. |
| 5,277,261 A | 1/1994 | Sakoh |
| 5,315,501 A | 5/1994 | Whitehouse |
| 5,592,396 A | 1/1997 | Tambini et al. |
| 5,903,462 A | 5/1999 | Wagner et al. |
| 5,942,975 A | 8/1999 | Sorensen |
| 6,055,484 A | 4/2000 | Lysaght |
| 6,123,241 A | 9/2000 | Walter et al. |
| 6,157,313 A | 12/2000 | Emmermann |
| 6,161,629 A | 12/2000 | Hohmann et al. |
| 6,279,668 B1 | 8/2001 | Mercer |
| 6,349,266 B1 | 2/2002 | Lysaght et al. |
| 6,390,205 B2 | 5/2002 | Wallgren et al. |
| 6,405,598 B1 | 6/2002 | Bareggi |
| 6,424,799 B1 | 7/2002 | Gilmore |
| 6,431,425 B1 | 8/2002 | Moorman et al. |
| 6,508,313 B1 | 1/2003 | Carney et al. |
| 6,520,270 B2 | 2/2003 | Wissmach et al. |
| 6,522,949 B1 | 2/2003 | Ikeda et al. |
| 6,598,684 B2 | 7/2003 | Watanabe |
| 6,607,041 B2 | 8/2003 | Suzuki et al. |
| 6,668,212 B2 | 12/2003 | Colangelo, II et al. |
| 6,675,196 B1 | 1/2004 | Kronz |
| 6,768,994 B1 | 1/2004 | Howard et al. |
| 6,687,567 B2 | 2/2004 | Watanabe |
| 6,784,801 B2 | 8/2004 | Watanabe et al. |
| 6,836,614 B2 | 12/2004 | Gilmore |
| 6,848,516 B2 | 2/2005 | Giardino |
| 6,872,121 B2 | 3/2005 | Wiener et al. |
| 6,913,087 B1 | 7/2005 | Brotto et al. |
| 6,923,285 B1 | 8/2005 | Rossow et al. |
| 6,938,689 B2 | 9/2005 | Farrant et al. |
| 6,954,048 B2 | 10/2005 | Cho |
| 6,968,908 B2 | 11/2005 | Tokunaga et al. |
| 7,034,711 B2 | 4/2006 | Sakatani et al. |
| 7,035,710 B2 | 4/2006 | Balling |
| 7,035,898 B1 | 4/2006 | Baker |
| 7,036,703 B2 | 5/2006 | Grazioli et al. |
| 7,062,998 B2 | 6/2006 | Hohmann et al. |
| 7,064,502 B2 | 6/2006 | Garcia et al. |
| 7,086,483 B2 | 8/2006 | Arimura et al. |
| 7,102,303 B2 | 9/2006 | Brotto et al. |
| 7,112,934 B2 | 9/2006 | Gilmore |
| 7,123,149 B2 | 10/2006 | Nowak et al. |
| 7,137,541 B2 | 11/2006 | Baskar et al. |
| 7,211,972 B2 | 5/2007 | Garcia et al. |
| 7,218,227 B2 | 5/2007 | Davis et al. |
| 7,243,440 B2 | 7/2007 | DeKeyser |
| 7,298,240 B2 | 11/2007 | Lamar |
| 7,328,086 B2 | 2/2008 | Perry et al. |
| 7,328,757 B2 | 2/2008 | Davies |
| 7,330,129 B2 | 2/2008 | Crowell et al. |
| 7,343,764 B2 | 3/2008 | Solfronk |
| 7,346,406 B2 | 3/2008 | Brotto et al. |
| 7,346,422 B2 | 3/2008 | Tsuchiya et al. |
| 7,359,762 B2 | 4/2008 | Etter et al. |
| 7,382,272 B2 | 6/2008 | Feight |
| 7,383,882 B2 | 6/2008 | Lerche et al. |
| 7,437,204 B2 | 10/2008 | Lev-Ami et al. |
| 7,464,769 B2 | 12/2008 | Nakazawa et al. |
| 7,501,778 B2 | 3/2009 | Hashimoto et al. |
| 7,540,334 B2 | 6/2009 | Gass et al. |
| 7,646,155 B2 | 1/2010 | Woods et al. |
| RE41,185 E | 3/2010 | Gilmore et al. |
| 7,690,569 B2 | 4/2010 | Swanson et al. |
| 7,750,811 B2 | 7/2010 | Puzio et al. |
| 7,772,850 B2 | 8/2010 | Bertness |
| 7,787,981 B2 | 8/2010 | Austin et al. |
| 7,795,829 B2 | 9/2010 | Seiler et al. |
| 7,809,495 B2 | 10/2010 | Leufen |
| 7,817,062 B1 | 10/2010 | Li et al. |
| 7,834,566 B2 | 11/2010 | Woods et al. |
| 7,850,071 B2 | 12/2010 | Sakamoto et al. |
| 7,868,591 B2 | 1/2011 | Phillips et al. |
| 7,898,403 B2 | 3/2011 | Ritter et al. |
| 7,900,524 B2 | 3/2011 | Calloway et al. |
| 7,911,379 B2 | 3/2011 | Cameron |
| 7,928,673 B2 | 4/2011 | Woods et al. |
| 7,931,096 B2 | 4/2011 | Saha |
| 7,942,084 B2 | 5/2011 | Wilson, Jr. et al. |
| 7,942,211 B2 | 5/2011 | Scrimshaw et al. |
| 7,953,965 B2 | 5/2011 | Qin et al. |
| 7,982,624 B2 | 7/2011 | Richter et al. |
| 8,004,397 B2 | 8/2011 | Forrest et al. |
| 8,004,664 B2 | 8/2011 | Etter et al. |
| 8,005,647 B2 | 8/2011 | Armstrong et al. |
| 8,044,796 B1 | 10/2011 | Carr, Sr. |
| 8,049,636 B2 | 11/2011 | Buckingham et al. |
| 8,161,613 B2 | 4/2012 | Schuele et al. |
| 8,169,298 B2 | 5/2012 | Wiesner et al. |
| 8,171,828 B2 | 5/2012 | Duvan et al. |
| 8,210,275 B2 | 7/2012 | Suzuki et al. |
| 8,255,358 B2 | 8/2012 | Ballew et al. |
| 8,260,452 B2 | 9/2012 | Austin et al. |
| 8,264,374 B2 | 9/2012 | Obatake et al. |
| 8,281,871 B2 | 10/2012 | Cutler et al. |
| 8,294,424 B2 | 10/2012 | Bucur |
| 8,306,836 B2 | 11/2012 | Nichols et al. |
| 8,310,206 B2 | 11/2012 | Bucur |
| 8,316,958 B2 | 11/2012 | Schell et al. |
| 8,330,426 B2 | 12/2012 | Suzuki et al. |
| 8,344,879 B2 | 1/2013 | Harmon et al. |
| 8,351,982 B2 | 1/2013 | Rofougaran |
| 8,406,697 B2 | 3/2013 | Arimura et al. |
| 8,412,179 B2 | 4/2013 | Gerold et al. |
| 8,438,955 B2 | 5/2013 | Wilson, Jr. et al. |
| 8,464,808 B2 | 6/2013 | Leü |
| 8,485,049 B2 | 7/2013 | Yokoyama et al. |
| 8,576,095 B2 | 11/2013 | Harmon et al. |
| 8,611,250 B2 | 12/2013 | Chen et al. |
| 8,645,176 B2 | 2/2014 | Walton et al. |
| 8,657,482 B2 | 2/2014 | Malackowski et al. |
| 8,666,936 B2 | 3/2014 | Wallace |
| 8,678,106 B2 | 3/2014 | Matsunaga et al. |
| 8,818,617 B2 | 8/2014 | Miller et al. |
| 8,823,322 B2 | 9/2014 | Noda et al. |
| 8,890,449 B2 | 11/2014 | Suzuki et al. |
| 8,919,456 B2 | 12/2014 | Ng et al. |
| 8,954,222 B2 | 2/2015 | Costantino |
| 8,954,227 B2 | 2/2015 | Bertosa et al. |
| 8,965,841 B2 | 2/2015 | Wallace |
| 8,981,680 B2 | 3/2015 | Suda et al. |
| 8,996,237 B2 | 3/2015 | Bertosa et al. |
| 9,002,572 B2 | 4/2015 | Lipscomb et al. |
| 9,030,145 B2 | 5/2015 | Brennenstuhl et al. |
| 9,031,585 B2 | 5/2015 | Kahle et al. |

(56) References Cited

U.S. PATENT DOCUMENTS

| | | |
|---|---|---|
| 9,038,743 B2 | 5/2015 | Aoki |
| 9,061,392 B2 | 6/2015 | Forgues et al. |
| 9,111,234 B2 | 8/2015 | Wallace et al. |
| 9,126,317 B2 | 9/2015 | Lawton et al. |
| 9,144,875 B2 | 9/2015 | Schlesak et al. |
| 9,194,917 B2 | 11/2015 | Brochhaus |
| 9,216,505 B2 | 12/2015 | Rejman et al. |
| 9,232,614 B2 | 1/2016 | Hiroi |
| 9,233,457 B2 | 1/2016 | Wanek et al. |
| 9,242,356 B2 | 1/2016 | King et al. |
| 9,256,988 B2 | 2/2016 | Wenger et al. |
| 9,281,770 B2 | 3/2016 | Wood et al. |
| 10,345,797 B2 | 7/2019 | Conrad et al. |
| 2001/0052416 A1 | 12/2001 | Wissmach et al. |
| 2002/0033267 A1 | 3/2002 | Schweizer et al. |
| 2003/0121677 A1 | 7/2003 | Watanabe et al. |
| 2004/0182587 A1 | 9/2004 | May et al. |
| 2006/0009879 A1 | 1/2006 | Lynch et al. |
| 2006/0076385 A1 | 4/2006 | Etter et al. |
| 2006/0234617 A1 | 10/2006 | Francis et al. |
| 2007/0252675 A1 | 11/2007 | Lamar |
| 2008/0084334 A1 | 4/2008 | Ballew |
| 2008/0086320 A1 | 4/2008 | Ballew |
| 2008/0086323 A1 | 4/2008 | Ballew et al. |
| 2008/0086349 A1 | 4/2008 | Petrie et al. |
| 2008/0086427 A1 | 4/2008 | Petrie |
| 2008/0086428 A1 | 4/2008 | Wallace |
| 2008/0086685 A1 | 4/2008 | Janky et al. |
| 2008/0252446 A1 | 10/2008 | Dammertz |
| 2009/0250364 A1 | 10/2009 | Gerold et al. |
| 2009/0251330 A1 | 10/2009 | Gerold et al. |
| 2009/0273436 A1 | 11/2009 | Gluck et al. |
| 2010/0096151 A1 | 4/2010 | Östling |
| 2010/0116519 A1 | 5/2010 | Gareis |
| 2010/0154599 A1 | 6/2010 | Gareis |
| 2010/0176766 A1 | 7/2010 | Brandner et al. |
| 2011/0056716 A1 | 3/2011 | Jönsson et al. |
| 2011/0067895 A1 | 3/2011 | Nobe et al. |
| 2011/0073343 A1 | 3/2011 | Sawano et al. |
| 2011/0162858 A1 | 7/2011 | Coste |
| 2011/0309931 A1 | 12/2011 | Rose |
| 2012/0166143 A1* | 6/2012 | Brown .............. G06F 11/3062 702/188 |
| 2012/0167721 A1 | 7/2012 | Fluhrer |
| 2012/0168189 A1 | 7/2012 | Eckert |
| 2012/0235791 A1* | 9/2012 | Donlan .............. G06Q 50/28 340/10.1 |
| 2012/0267134 A1 | 10/2012 | Matthias et al. |
| 2012/0292070 A1 | 11/2012 | Ito et al. |
| 2012/0325507 A1 | 12/2012 | Fluhrer et al. |
| 2013/0024245 A1 | 1/2013 | Nichols et al. |
| 2013/0062086 A1 | 3/2013 | Ito et al. |
| 2013/0071815 A1 | 3/2013 | Hudson et al. |
| 2013/0087355 A1 | 4/2013 | Oomori et al. |
| 2013/0109375 A1* | 5/2013 | Zeiler .............. H04W 4/029 455/426.1 |
| 2013/0118767 A1 | 5/2013 | Cannaliato et al. |
| 2013/0126202 A1 | 5/2013 | Oomori et al. |
| 2013/0133907 A1 | 5/2013 | Chen et al. |
| 2013/0133911 A1 | 5/2013 | Ishikawa et al. |
| 2013/0138465 A1 | 5/2013 | Kahle et al. |
| 2013/0138606 A1 | 5/2013 | Kahle et al. |
| 2013/0153250 A1 | 6/2013 | Eckert |
| 2013/0187587 A1* | 7/2013 | Knight .............. H02P 6/08 318/400.37 |
| 2013/0188058 A1 | 7/2013 | Nguyen et al. |
| 2013/0191417 A1 | 7/2013 | Petrie et al. |
| 2013/0204753 A1 | 8/2013 | Wallace |
| 2013/0255980 A1 | 10/2013 | Linehan et al. |
| 2013/0304545 A1 | 11/2013 | Ballew et al. |
| 2013/0327552 A1* | 12/2013 | Lovelass .............. B25B 23/147 173/1 |
| 2014/0006295 A1 | 1/2014 | Zeiler et al. |
| 2014/0070924 A1 | 3/2014 | Wenger et al. |
| 2014/0107853 A1 | 4/2014 | Ashinghurst et al. |
| 2014/0122143 A1 | 5/2014 | Fletcher et al. |
| 2014/0151079 A1 | 6/2014 | Furui et al. |
| 2014/0158389 A1 | 6/2014 | Ito et al. |
| 2014/0159662 A1 | 6/2014 | Furui et al. |
| 2014/0159919 A1 | 6/2014 | Furui et al. |
| 2014/0159920 A1 | 6/2014 | Furui et al. |
| 2014/0166324 A1 | 6/2014 | Puzio et al. |
| 2014/0184397 A1* | 7/2014 | Volpert .............. B25F 5/00 340/12.51 |
| 2014/0262389 A1 | 9/2014 | Simone et al. |
| 2014/0266024 A1 | 9/2014 | Chinnadurai et al. |
| 2014/0284070 A1 | 9/2014 | Ng et al. |
| 2014/0292245 A1 | 10/2014 | Suzuki et al. |
| 2014/0324194 A1 | 10/2014 | Larsson et al. |
| 2014/0331830 A1 | 11/2014 | King et al. |
| 2014/0334270 A1 | 11/2014 | Kusakawa |
| 2014/0336810 A1 | 11/2014 | Li et al. |
| 2014/0336955 A1 | 11/2014 | Li et al. |
| 2014/0350716 A1 | 11/2014 | Fly et al. |
| 2014/0365259 A1 | 12/2014 | Delplace et al. |
| 2014/0367134 A1 | 12/2014 | Phillips et al. |
| 2014/0379136 A1 | 12/2014 | Schlegel et al. |
| 2015/0000944 A1 | 1/2015 | Dusselberg et al. |
| 2015/0002089 A1 | 1/2015 | Rejman et al. |
| 2015/0042247 A1 | 2/2015 | Kusakawa |
| 2015/0122524 A1 | 5/2015 | Papp |
| 2015/0127205 A1 | 5/2015 | Brochhaus |
| 2015/0135306 A1 | 5/2015 | Winkler et al. |
| 2015/0135907 A1 | 5/2015 | Hirabayashi et al. |
| 2015/0137721 A1 | 5/2015 | Yamamoto et al. |
| 2015/0158157 A1 | 6/2015 | Hirabayashi et al. |
| 2015/0158170 A1 | 6/2015 | Nitsche et al. |
| 2015/0171654 A1 | 6/2015 | Horie et al. |
| 2015/0179036 A1 | 6/2015 | Heine et al. |
| 2015/0191096 A1 | 7/2015 | Becker et al. |
| 2015/0340921 A1 | 11/2015 | Suda et al. |
| 2017/0008159 A1 | 1/2017 | Boeck et al. |

FOREIGN PATENT DOCUMENTS

| | | |
|---|---|---|
| EP | 2147750 | 1/2010 |
| JP | 2000176850 | 6/2000 |
| JP | 2004072563 | 3/2004 |
| JP | 2006123080 | 5/2006 |
| WO | 2002030624 | 4/2002 |
| WO | 2007090258 | 8/2007 |
| WO | 2013116303 | 8/2013 |

* cited by examiner

POWER TOOL OPERATION RECORDING AND PLAYBACK

RELATED APPLICATIONS

This application is a continuation of U.S. application Ser. No. 16/414,587, filed on May 16, 2019, now U.S. Pat. No. 10,556,330, which is a continuation of U.S. application Ser. No. 15/267,571, filed on Sep. 16, 2016, now U.S. Pat. No. 10,345,797, which claims the benefit of and claims priority to U.S. Provisional Patent Application No. 62/220,627, filed on Sep. 18, 2015, the entire contents of which are hereby incorporated by reference.

FIELD OF THE INVENTION

The present invention relates generally to power tools, such as power drills or impact drivers.

SUMMARY

In one embodiment, the invention provides a method for operating power tools that includes receiving a command to start a recording mode at a first electronic processor of a first power tool, and receiving at the first electronic processor, a measured parameter from a sensor of the first power tool while a first motor of the first power tool is operating. The method also includes generating a recorded motor parameter by recording the measured parameter, on a first memory of the first power tool, when the first power tool operates in the recording mode, and transmitting, with a first transceiver of the first power tool, the recorded motor parameter. The method further includes receiving the recorded motor parameter at an external device, transmitting the recorded motor parameter to a second power tool via the external device, and receiving the recorded motor parameter via a second transceiver of the second power tool.

In another embodiment, the invention provides a power tool system that includes a first power tool, an external device, and a second power tool. The first power tool includes a first motor, a sensor coupled to the first motor and configured to measure a parameter of the first motor. The first power tool also includes a first electronic processor coupled to the first motor and the sensor, and a first transceiver coupled to the first electronic processor. The first electronic processor configured to receive a command to start a recording mode, and generate a recorded motor parameter by recording the measured parameter while the first motor is operating and the first power tool is in the recording mode. The first transceiver is configured to transmit the recorded motor parameter to the external device. The external device is in communication with the first power tool, and includes a device transceiver. The device transceiver is configured to receive the recorded motor parameter from the first power tool, and transmit the recorded motor parameter to a second power tool. The second power tool is in communication with the external device, and includes a second transceiver and a second electronic processor. The second transceiver is configured to receive the recorded motor parameter from the external device. The second electronic processor is configured to store the recorded motor parameter.

In one embodiment, the invention provides a power tool including a motor, a sensor coupled to the motor, a transceiver, and an electronic processor. The sensor is configured to measure a parameter of the motor. The electronic processor is coupled to the motor, the sensor, and the transceiver, and is configured to receive, from an external device via the transceiver, a command to start a recording mode. The electronic processor is also configured to generate a recorded motor parameter by recording the measured parameter while the motor is operating and the power tool is in the recording mode, and transmit, via the transceiver, the recorded motor parameter to the external device.

In some instances, the power tool further includes a mode selector switch configured to receive a user mode selection, the user mode selection indicating an operating mode selected from a plurality of operating modes. In some instances, the processor is configured to receive the motor parameter from the external device as part of a tool profile; assign the tool profile to one mode of the plurality of operating modes rendering the one mode a playback mode; and operate the motor in accordance with the motor parameter when the mode selector switch indicates selection of the playback mode and upon receipt of an activation signal from a trigger of the power tool. In some instances, the motor parameter has a duration and, while the power tool is in the playback mode and the trigger is in the depressed state, the controller is configured to stop operating the motor based on the recorded motor parameter when the duration ends. In some instances, the motor parameter includes at least one selected from the group consisting of a duty cycle indicating trigger pull, a motor speed, a motor torque, a motor power, and a number of impact activations. In some instances, the processor is configured to begin to record the motor parameter for a predetermined time period upon at least one selected from the group consisting of entering the recording mode, receiving an activation signal from a trigger of the power tool, and receiving a start request from the external device. In some instances, the processor is configured to stop recording the motor parameter upon at least one selected from the group consisting of detecting a release of the trigger and receiving a stop request from the external device.

In another embodiment, the invention provides a method of operating a power tool including a motor, a communication controller, and a processor. The method includes forming a communication link between the communication controller of the power tool and an external device. The method also includes entering, by the processor, a recording mode based on a signal received from the external device over the communication link. The method further includes recording, by the processor, a motor parameter while the power tool is in the recording mode and the motor is operating to generate a recorded motor parameter. The method further includes transmitting, by the communication controller, the motor parameter recorded during operation of the power tool in the recording mode to the external device.

In some instances, the method includes receiving, by a mode selector switch of the power tool, a user mode selection. The user mode selection indicates an operating mode selected from a plurality of operating modes. In some instances, the method includes receiving, by the processor, the motor parameter from the external device as part of a tool profile; assigning the tool profile to one mode of the plurality of operating modes rendering the one mode a playback mode; and operating the motor in accordance with the motor parameter when the mode selector switch indicates selection of the playback mode and upon receipt of an activation signal from a trigger of the power tool. In some instances, the motor parameter has a duration and, while the power tool is in the playback mode and the trigger is in the depressed state, the controller is configured to stop operating the motor based on the recorded motor parameter when the duration ends. In some instances, the motor parameter includes at least one selected from the group consisting of a duty cycle indicating trigger pull, a motor speed, a motor torque, a motor power, and a number of impact activations. In some instances, the processor is configured to begin to record the motor parameter for a predetermined time period upon at least one selected from the group consisting of entering the recording mode, receiving an activation signal from a trigger of the power tool, and receiving a start request from the external device. In some instances, the processor is configured to stop recording the motor parameter upon at least one selected from the group consisting of detecting a release of the trigger and receiving a stop request from the external device. In some instances, the motor parameter covers a first time period in which the motor is operating in response to depression of the trigger; a second time period in which the motor is inactive in response to release of the trigger; and a third time period in which the motor is operating in response to another depression of the trigger.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
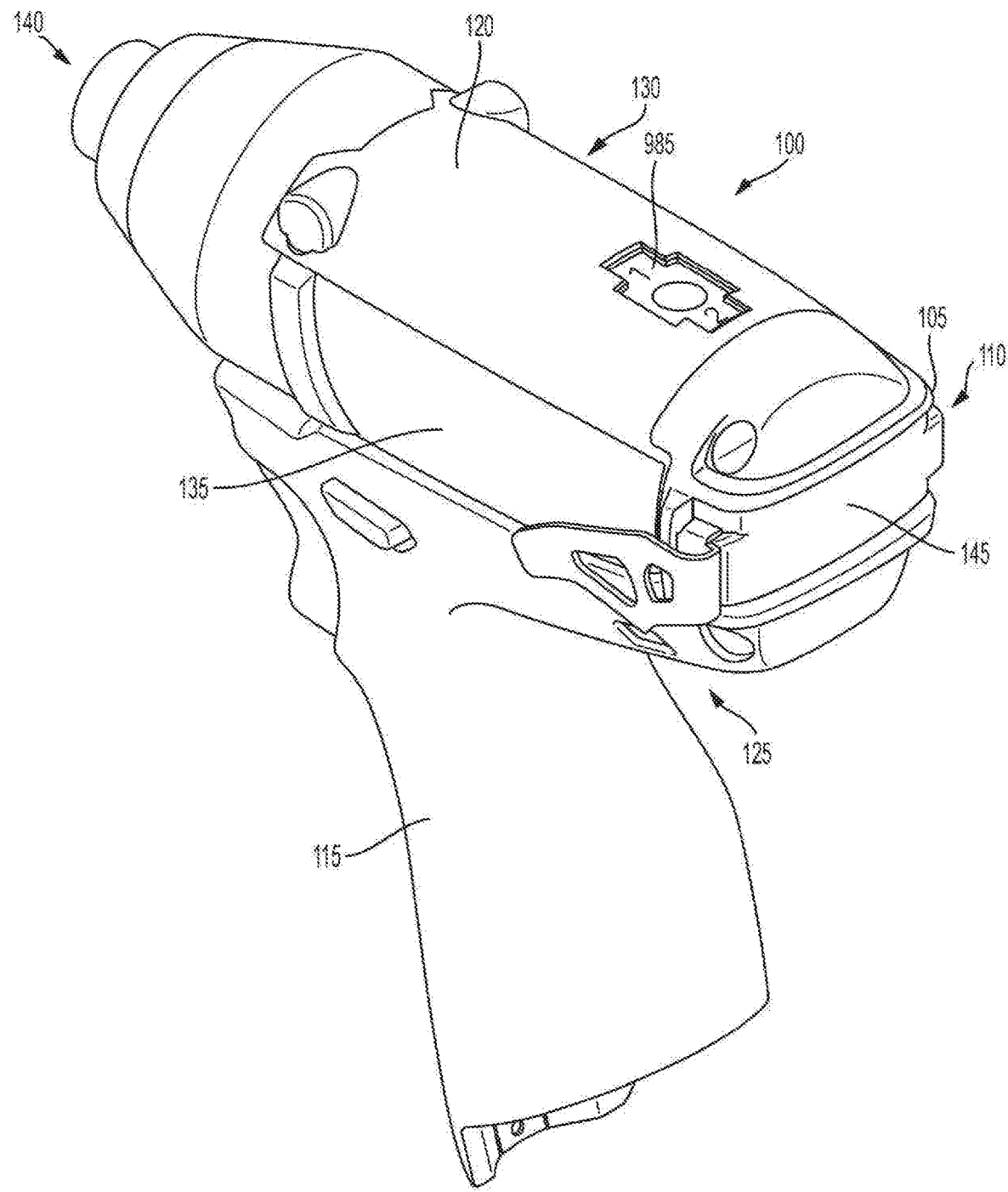
FIG. 1 is a perspective view of a tool according to one embodiment of the invention.
Figure 2:
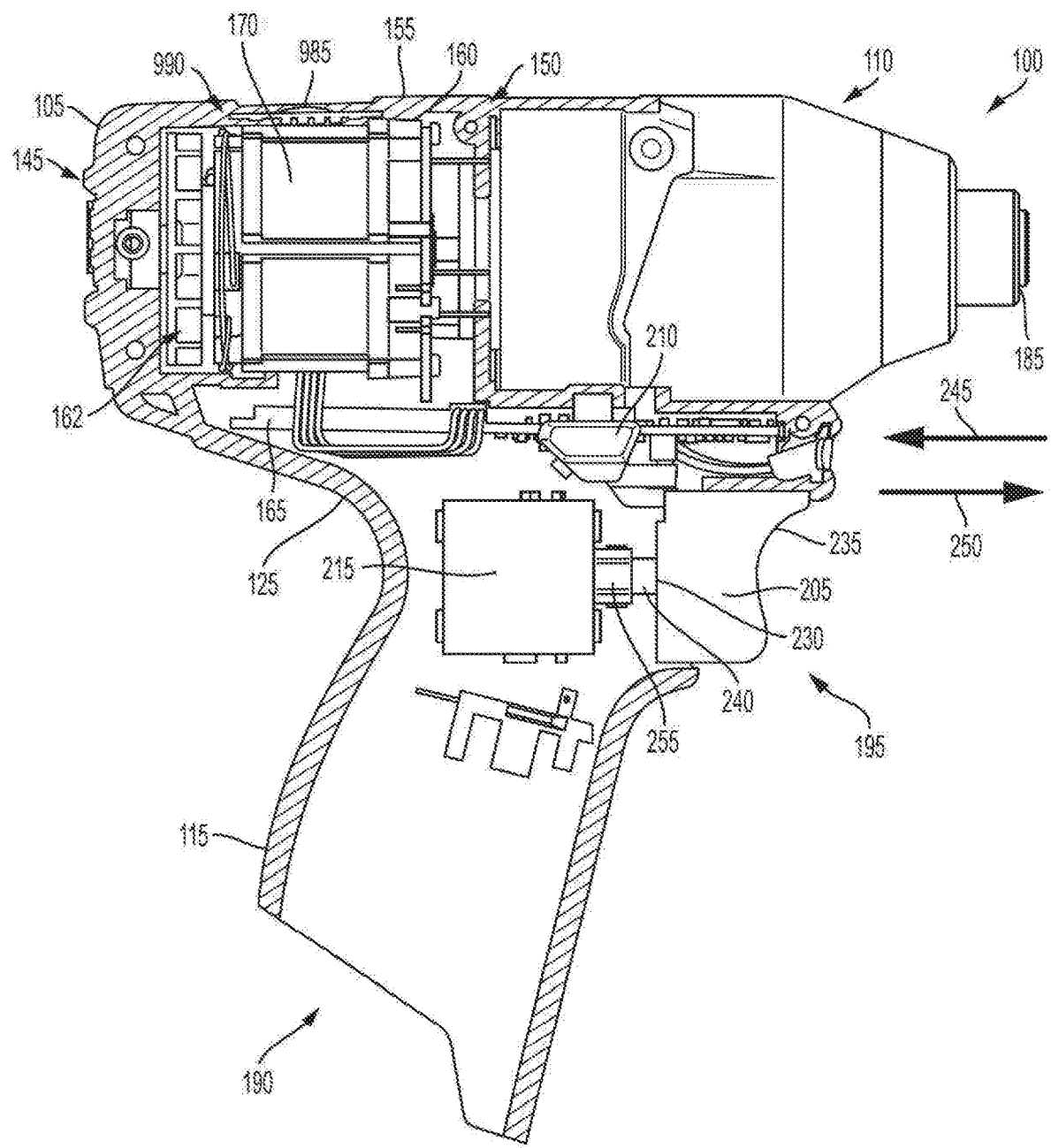
FIG. 2 is a side view of the tool shown in FIG. 1 with a portion of a tool housing removed.

FIG. 1 is a perspective view of a power tool 100 in the form of an impact driver for illustrative purposes, but which may be another power tool such as a power drill, an impact driver, a power saw, an angle driver, etc.). The tool 100 includes a tool housing 105 defining a body portion 110 and a handle 115. The body portion 110 of the tool housing 105 includes a top surface 120, a bottom surface 125, side surfaces 130, 135, a front surface 140, and a rear surface 145. FIG. 2 illustrates the tool 100 with a portion of the tool housing 105 removed. The tool housing 105 further includes a wall 150 defining an exterior surface 155 and an interior surface 160 of the housing 105. The interior surface 160 defines a cavity 162 within the body portion 110.

A printed circuit board (PCB) 165 and a motor 170 are located within the cavity 162 of the body portion 110. The motor 170 is coupled to the interior surface 160 via a motor mount. The PCB 165 is electrically coupled to the motor 170 and includes electrical and electronic components that are operable to control the tool 100. In the illustrated embodiment, the PCB 165 includes an electronic processor 180 (FIG. 6) for controlling operation of the tool 100.

The motor 170 is a multi-speed, brushless direct-current (BLDC) motor. As is commonly known, BLDC motors include a stator, a permanent magnet rotor, and an electronic commutator. The electronic commutator typically includes, among other things, a programmable device (e.g., a microcontroller, a digital signal processor, or a similar controller) having a processor and a memory. The programmable device of the BLDC motor uses software stored in the memory to control the electric commutator. The electric commutator then provides the appropriate electrical energy to the stator in order to rotate the permanent magnet rotor at a desired speed. In some embodiments, the electronic processor 180 acts as the programmable device of the motor 170. In other embodiments, the programmable device is separate from the electronic processor 180. In other embodiments of the motor 170, the motor 170 can be a variety of other types of multi-speed or variable-speed motors, including but not limited to, a brush direct-current motor, a stepper motor, a synchronous motor, an induction motor, a vector-driven motor, a switched reluctance motor, and other DC or AC motors. The motor 170 is used to drive a working element 185 (FIG. 2). In the illustrated embodiment, the working element 185 is located on the front surface 140 of the body portion 110. In the illustrated embodiment the working element 185 is a drill chuck, but other types of tools, such as angle grinders, saws, etc., will use different working elements.

In the illustrated embodiment, the handle 115 extends downwardly from the bottom surface 125 of the body portion 110 such that the tool 100 has a pistol-style grip. A battery receptacle 190 is located at a distal end of the handle 115, and a trigger mechanism 195 is positioned on the handle 115 proximate the body portion 110.

The battery receptacle 190 receives a battery 200 (FIG. 6), which provides power to the tool 100. In some embodiments, the battery 200 is a rechargeable lithium-ion battery. In other embodiments, the battery 200 may have a chemistry other than lithium-ion such as, for example, nickel cadmium, nickel metal-hydride, etc. Additionally or alternatively, the battery 200 may be a non-rechargeable battery. In some embodiments, the battery 200 is a power tool battery including a pack housing containing one or more battery cells and a latching mechanism for selectively securing the battery 200 to the battery receptacle 190. In another embodiment, the battery 200 is mounted externally to the handle 115. In another embodiment, the battery 200 is mounted below the handle 115. In another embodiment, an electrical cord provides power to the tool 100.

Referring to FIGS. 2-5, the trigger mechanism 195 includes a trigger 205, a direction switch 210, and an electrical switch 215. In the illustrated embodiment, the trigger 205 extends partially down a length of the handle 115; however, in other embodiments the trigger 205 extends down the entire length of the handle 115 or may be positioned elsewhere on the tool 100. The trigger 205 is moveably coupled to the handle 115 such that the trigger 205 moves with respect to the tool housing 105. The trigger 205 includes an interior portion 230 and an exterior portion 235, which is accessible to the user. The interior portion 230 is coupled to a push rod 240, which is engageable with the electrical switch 215. The exterior portion 235 of the trigger 205 moves in a first direction 245 towards the handle 115, when the trigger 205 is depressed by the user. The exterior portion 235 moves in a second direction 250, away from the handle 115, when the trigger 205 is released by the user. When the trigger 205 is depressed by the user, the push rod 240 activates the electrical switch 215, and when the trigger 205 is released by the user, the electrical switch 215 is deactivated.

In the illustrated embodiment, the electrical switch 215 is a push-button electrical switch positioned within the handle 115. The electrical switch 215 includes a push button 255 and electrical contacts. When the push button 255 is activated, such as by the push rod 240, the electrical contacts are in a CLOSED position. When the electrical contacts are in the CLOSED position, electrical current is supplied from the battery to the motor 170, via the electronic processor 180. When the push button 255 is not activated, the electrical contacts are in the OPEN position. When the electrical contacts are in the OPEN position, electrical current is not supplied from the battery to the motor 170. Although the electrical switch 215 is illustrated as a push-button electrical switch with contacts, other types of electrical switches may be used with the tool 100. For example, in some embodiments, the electrical switch 215 may be activated by, for example, a position sensor (e.g., a Hall-Effect sensor) that relays information about the relative position of the trigger 205. The electrical switch 215 outputs a signal indicative of the position of the trigger 205.

Figure 3:
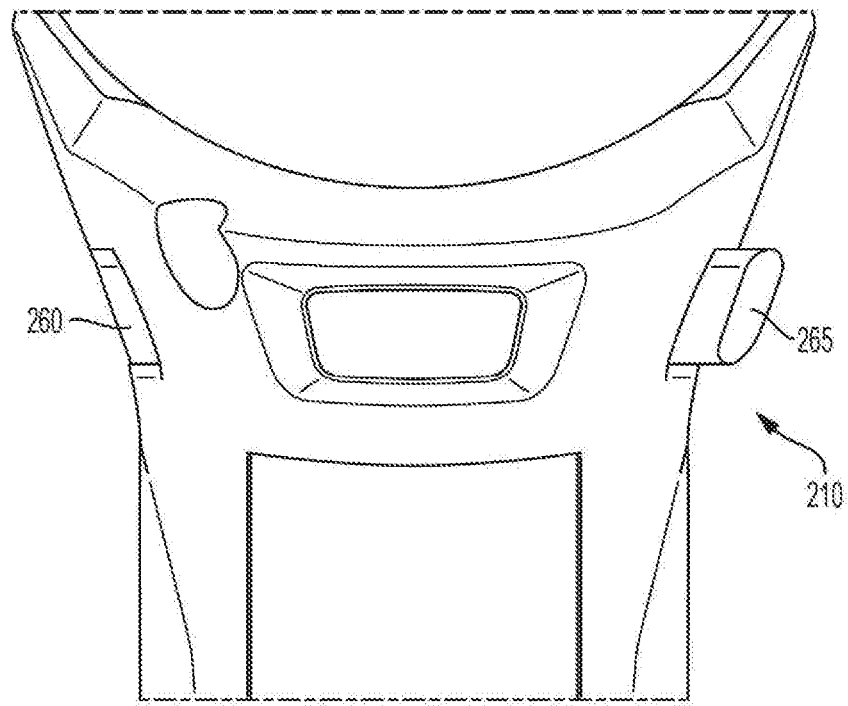
FIG. 3 illustrates a direction switch of the tool shown in FIG. 1 in a FORWARD position.
Figure 4:
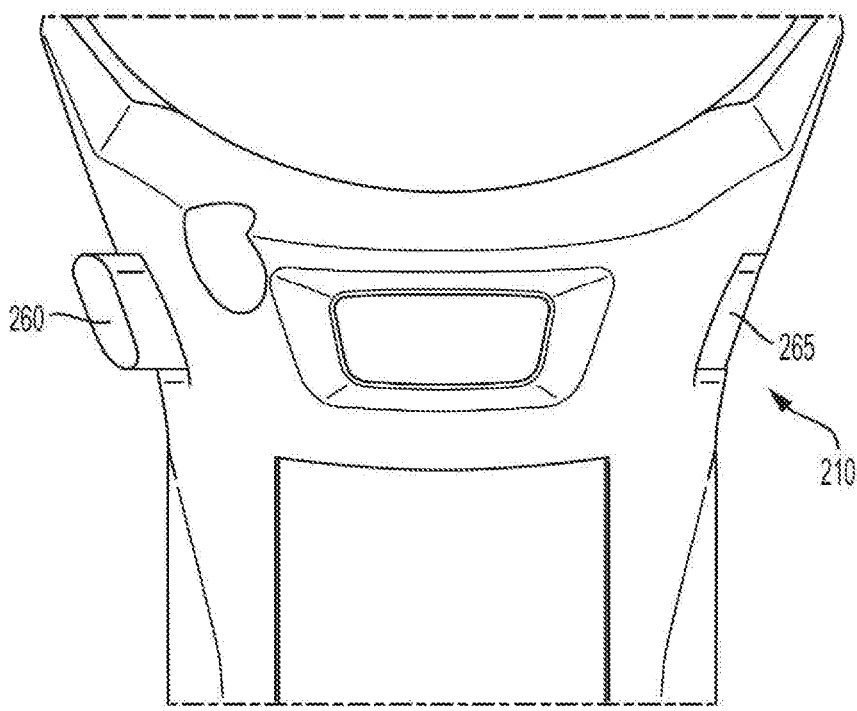
FIG. 4 illustrates the direction switch of the tool shown in FIG. 1 in a REVERSE position.
Figure 5:
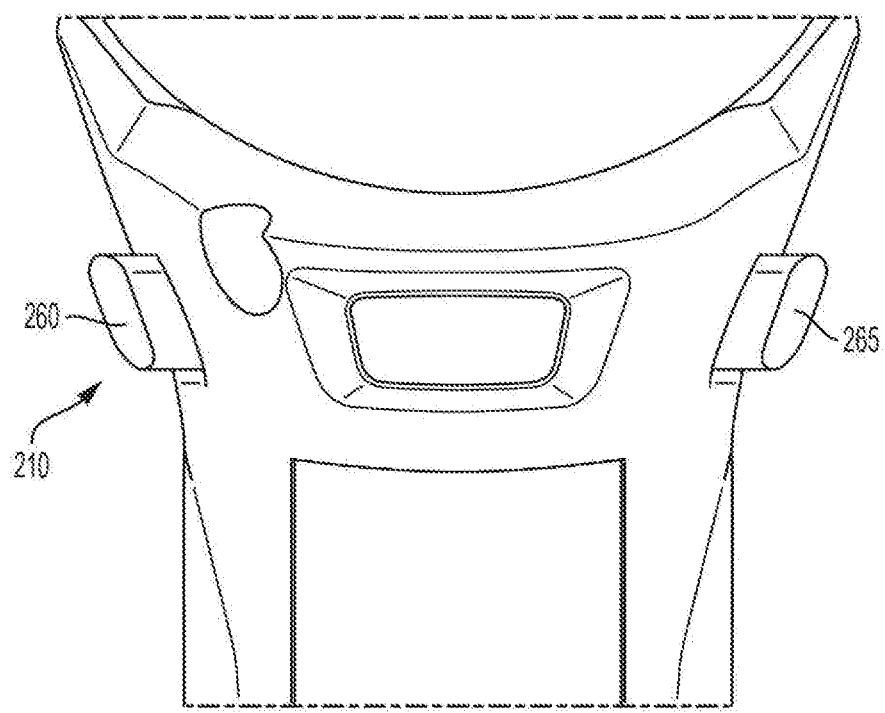
FIG. 5 illustrates the direction switch of the tool shown in FIG. 1 in a NEUTRAL position.

The direction switch 210 is located above the trigger 205 and below the body portion 110 of the tool 100. The direction switch 210 is slidingly coupled to the handle 115. As shown in FIGS. 3-5, the direction switch 210 includes a first side 260 and a second side 265. The direction switch 210 controls the directional mode of operation of the motor 170 (e.g., FORWARD, REVERSE, and NEUTRAL) by sending a signal, based on the position of the direction switch 210, to the electronic processor 180. As shown in FIG. 3, when the first side 260 of the direction switch 210 is fully depressed, the direction switch 210 is in a first position. When the direction switch 210 is in the first position, the mode of operation for motor 170 is in the FORWARD direction. As shown in FIG. 4, when the second side 265 of the direction switch 210 is fully depressed, the direction switch 210 is in a second position, the second position being opposite the first position. When the direction switch 210 is in the second position, the mode of operation of the motor 170 is in the REVERSE direction. As shown in FIG. 5, when the direction switch 210 is in a third position, neither the first side 260 or second side 265 is fully depressed, and the mode of operation of the motor 170 is NEUTRAL.

Figure 6:
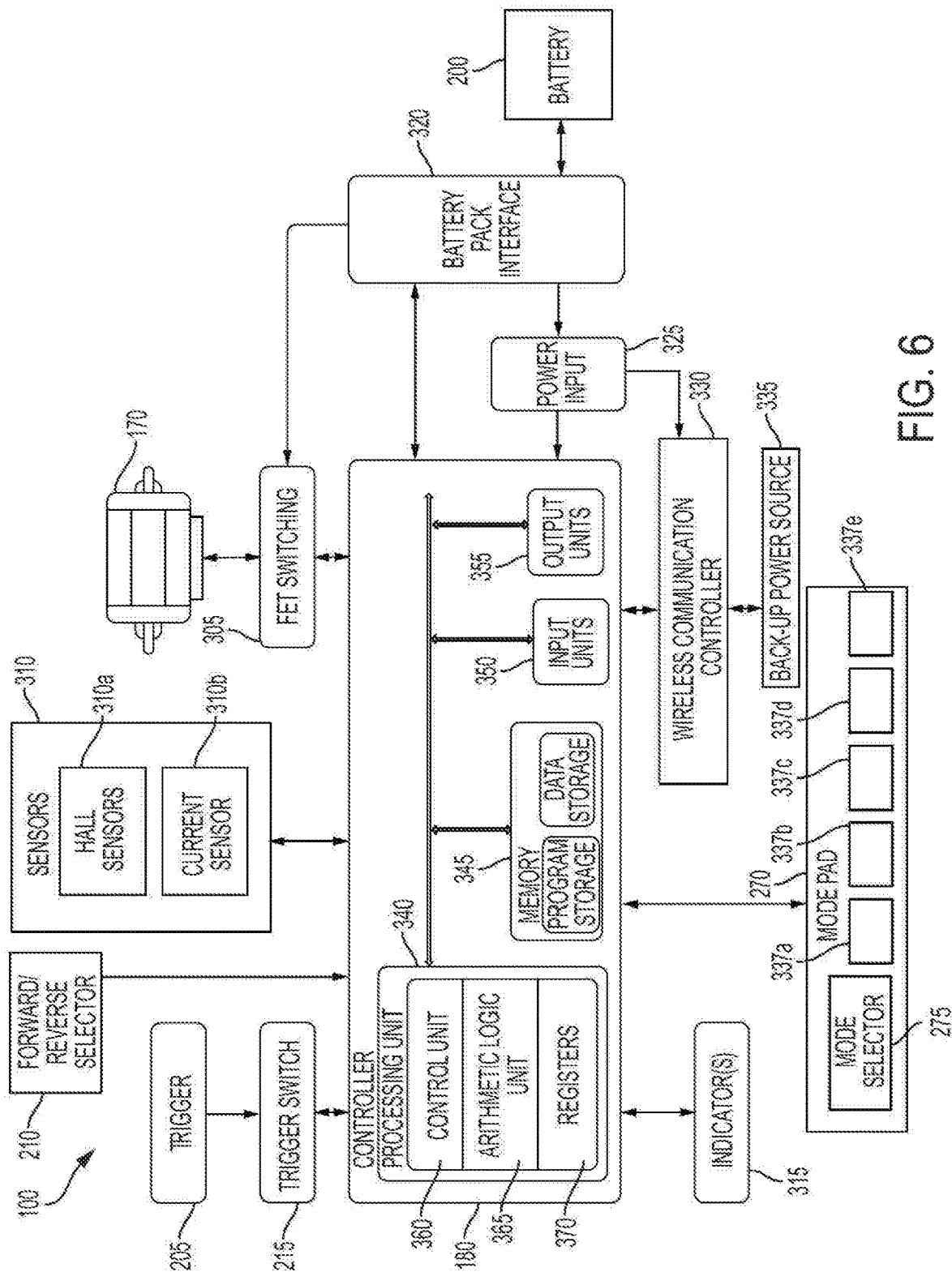
FIG. 6 illustrates a block diagram of the power tool shown in FIG. 1.

FIG. 6 is an electrical schematic of the tool 100 including the electronic processor 180. As shown in FIG. 6, the power tool 100 also includes a mode pad 270, a switching network 305, sensors 310, indicators 315, a battery pack interface 320, a power input unit 325, a wireless communication controller 330, and a back-up power source 335. The battery pack interface 320 is coupled to the electronic processor 180 and coupled to the battery pack 200. The battery pack interface 320 includes a combination of mechanical (e.g., the battery receptacle 190) and electrical components configured to and operable for interfacing (e.g., mechanically, electrically, and communicatively connecting) the power tool 100 with the battery pack 200. The battery pack interface 320 is coupled to the power input unit 325. The battery pack interface 320 transmits the power received from the battery pack 200 to the power input unit 325. The power input unit 325 includes active and/or passive components (e.g., voltage step-down controllers, voltage converters, rectifiers, filters, etc.) to regulate or control the power received through the battery pack interface 320 and to the wireless communication controller 330 and electronic processor 180.

The switching network 305 enables the electronic processor 180 to control the operation of the motor 170. Generally, when the trigger 205 is depressed as indicated by an output of the electrical switch 215, electrical current is supplied from the battery pack interface 320 to the motor 170, via the switching network 305. When the trigger 205 is not depressed, electrical current is not supplied from the battery pack interface 320 to the motor 170.

In response to the electronic processor 180 receiving the activation signal from the electrical switch 215, the electronic processor 180 activates the switching network 305 to provide power to the motor 170. The switching network 305 controls the amount of current available to the motor 170 and thereby control the speed and torque output of the motor 170. The switching network 305 may include numerous FETs, bipolar transistors, or other types of electrical switches. For instance, the switching network 305 may include a six-FET bridge that receives pulse-width modulated (PWM) signals from the electronic processor 180 to drive the motor 170.

The mode pad 270 is a user interface on the housing 105 power tool 100 such that the mode pad 270 is accessible to the user. The mode pad 270 includes a mode selection switch 275 and mode indicator LEDs 337a-e. In the illustrated embodiment, the power tool 100 has five selectable modes (one, two, three, four, and adaptive), each associated with a different one of the mode indicator LEDs 337a-e. The mode selection switch 275 is a pushbutton that cycles through the five selectable modes upon each press (e.g., mode 1, 2, 3, 4, 5, 1, 2, and so on). When a specific mode is selected, the associated mode indicator LED 337 lights up thereby indicating to the user the selected mode. For example, if the user selects mode one ("1") using the mode selection switch 275, the LED 337*a* associated with mode one lights up. In other embodiments, the power tool 100 has more or fewer modes, and the mode selection switch 275 may be a different type of mode selection mechanism such as, for example, a slide switch and/or a rotary switch.

The sensors 310 are coupled to the electronic processor 180 and communicate to the electronic processor 180 various signals indicative of different parameters of the power tool 100 and/or the motor 170. The sensors 310 include Hall-Effect sensors 310*a*, current sensors 310*b*, among other sensors, such as, for example, one or more voltage sensors, one or more temperature sensors, one or more torque sensors. Each Hall-Effect sensor 310*a* outputs motor feedback information to the electronic processor 180, such as an indication (e.g., a pulse) when a magnet of the motor's rotor rotates across the face of that particular Hall-Effect sensor 310*a*. Based on the motor feedback information from the Hall-Effect sensors 310*a*, the electronic processor 180 can determine the position, velocity, and acceleration of the rotor. In response to the motor feedback information and the signal from the electrical switch 215 of the trigger 205, the electronic processor 180 transmits control signals to control the switching network 305 to drive the motor 170. For instance, by selectively enabling and disabling the FETs of the switching network 305, power received via the battery pack interface 320 is selectively applied to stator coils of the motor 170 to cause rotation of its rotor. The motor feedback information is used by the electronic processor 180 to ensure proper timing of control signal to the switching network 305 and, in some instances, to provide closed-loop feedback to control the speed of the motor 170 to be at a desired level.

The indicators 315 are also coupled to the electronic processor 180 and receive control signals from the electronic processor 180 to turn on and off or otherwise convey information based on different states of the power tool 100. The indicators 315 include, for example, one or more light-emitting diodes (LEDs), or a display screen. The indicators 315 can be configured to display conditions of, or information associated with, the power tool 100. For example, the indicators 315 are configured to indicate measured electrical characteristics of the power tool 100, the status of the power tool 100, the mode of the power tool 100 (discussed in more detail below), etc. the indicators 315 may also include elements to convey information to a user through audible or tactile outputs.

As described above, the electronic processor 180 is electrically and/or communicatively connected to a variety of modules or components of the tool 100. In some embodiments, the electronic processor 180 includes a plurality of electrical and electronic components that provide power, operational control, and protection to the components and modules within the electronic processor 180 and/or power tool 100. For example, the electronic processor 180 includes, among other things, a processing unit 340 (e.g., a microprocessor, a microcontroller, or another suitable programmable device), a memory 345, input units 350, and output units 355. The processing unit 340 includes, among other things, a control unit 360, an arithmetic logic unit ("ALU") 365, and a plurality of registers 370 (shown as a group of registers in FIG. 6). In some embodiments, the electronic processor 180 is implemented partially or entirely on a semiconductor (e.g., a field-programmable gate array ["FPGA"] semiconductor) chip, such as a chip developed through a register transfer level (RTL") design process.

The memory 345 includes, for example, a program storage and a data storage. The program storage and the data storage can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The electronic processor 180 is connected to the memory 345 and executes software instructions that are capable of being stored in a RAM of the memory 345 (e.g., during execution), a ROM of the memory 345 (e.g., on a generally permanent basis), or another non-transitory computer readable medium such as another memory or a disc. Software included in the implementation of the tool 100 can be stored in the memory 345 of the electronic processor 180. The software includes, for example, firmware, one or more applications, program data, filters, rules, one or more program modules, and other executable instructions. The electronic processor 180 is configured to retrieve from memory and execute, among other things, instructions related to the control processes and method described herein. The electronic processor 180 is also configured to store power tool information on the memory 345 including motor operational parameters, general tool operational data, information identifying the type of tool, a unique identifier for the particular tool, and other information relevant to operating or maintaining the power tool 100. The tool usage information, such as current levels, motor speed, motor acceleration, motor direction, number of impacts, may be captured or inferred from data output by the sensors 310. Such power tool information may then be accessed by a user with the external device 300. In other embodiments, the electronic processor 180 includes additional, fewer, or different components.

The communication controller 330 is coupled to the electronic processor 180. In the illustrated embodiment, the communication controller 330 is a wireless communication controller 330. In other embodiments, the communication controller 330 may be a wired communication controller 330 including at least a port for receiving a communication connector of the external device 300. In the illustrated embodiment, the communication controller 330 is located near the foot of the tool 100 to save space and ensure that the magnetic activity of the motor 170 does not affect the wireless communication between the power tool 100 and the external device 300. As a particular example, in some embodiments, the wireless communication controller 330 is positioned under the mode pad 270.

Figure 7:
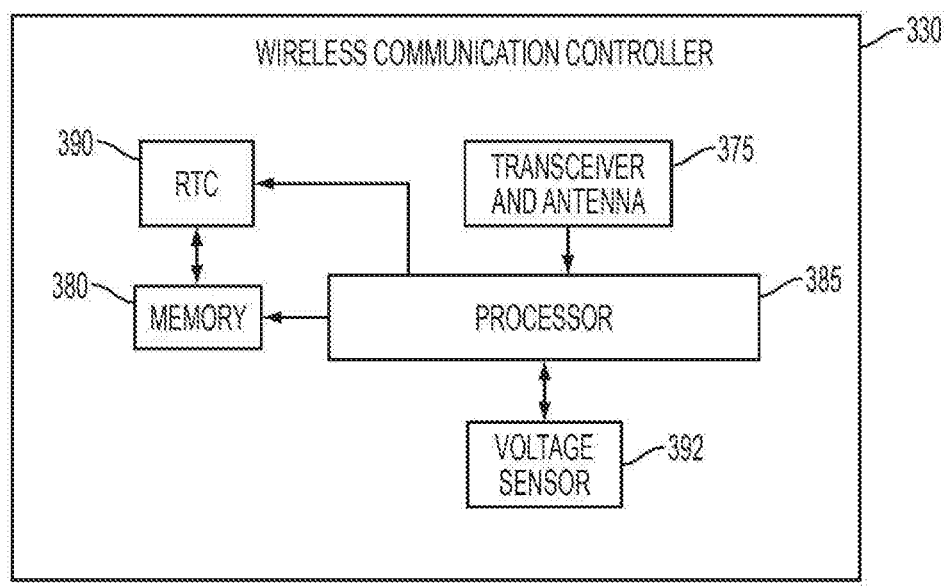
FIG. 7 illustrates a block diagram of a communication controller of the power tool shown in FIG. 1.

As shown in FIG. 7, the wireless communication controller 330 includes a radio transceiver and antenna 375, a memory 380, a processor 385, a real-time clock 390, and a voltage sensor 392. The radio transceiver and antenna 375 operate together to send and receive wireless messages to and from the external device 300 and the processor 385 of the wireless communication controller 330. The memory 380 can store instructions to be implemented by the processor 385 of the wireless communication controller 330 and/or may store data related to communications between the power tool 100 and the external device 300 or the like. The processor 385 of the wireless communication controller 330 controls wireless communications between the power tool 100 and the external device 300. For example, the wireless communication controller 330 buffers incoming and/or outgoing data, communicates with the electronic processor 180, and determines the communication protocol and/or settings to use in wireless communications.

In the illustrated embodiment, the wireless communication controller 330 is a Bluetooth® controller. The Bluetooth® controller communicates with the external device 300 employing the Bluetooth® protocol. Therefore, in the illustrated embodiment, the external device 300 and the power tool 100 are within a communication range (i.e., in proximity) of each other while they exchange data. In other embodiments, the wireless communication controller 330 communicates using other protocols (e.g., Wi-Fi, cellular protocols, a proprietary protocol, etc.) over different types of wireless networks. For example, the wireless communication controller 330 may be configured to communicate via Wi-Fi through a wide area network such as the Internet or a local area network, or to communicate through a piconet (e.g., using infrared or NFC communications). The communications via the communication controller 330 may be encrypted to protect the data exchanged between a) the power tool 100 and b) the external device 300 and/or a network from third parties.

The wireless communication controller 330 is configured to receive data from the power tool processor 180 and relay information to the external device 300 via the transceiver and antenna 375. In a similar manner, the wireless communication controller 330 is configured to receive information (e.g., configuration and programming information) from the external device 300 via the transceiver and antenna 375 and relay the information to the electronic processor 180.

The RTC 390 increments and keeps time independently of the other power tool components. The RTC 390 receives power from the battery pack 200 when the battery pack 200 is connected to the power tool 100 and receives power from the back-up power source 335 when the battery pack 200 is not connected to the power tool 100. Having the RTC 390 as an independently powered clock enables time stamping of operational data (stored in memory 345 for later export). The voltage sensor 392 monitors the voltage of the back-up power source 335.

When the wireless communication controller 330 establishes a wireless communication link with the external device 300, the wireless communication controller 330 obtains and exports tool usage data, maintenance data, mode information, drive device information, and the like from the power tool 100. The exported information can be used by tool users or owners to log data related to a particular power tool 100 or to specific job activities. The exported and logged data can indicate when work was accomplished and that work was accomplished to specification. The logged data can also provide a chronological record of work that was performed, track duration of tool usage, and the like. The wireless communication controller 330 also imports (i.e., receives) information from the external device 300 into the power tool 100 such as, for example, configuration data, operation thresholds, maintenance thresholds, mode configurations, programming for the power tool 100, and the like.

Figure 8:
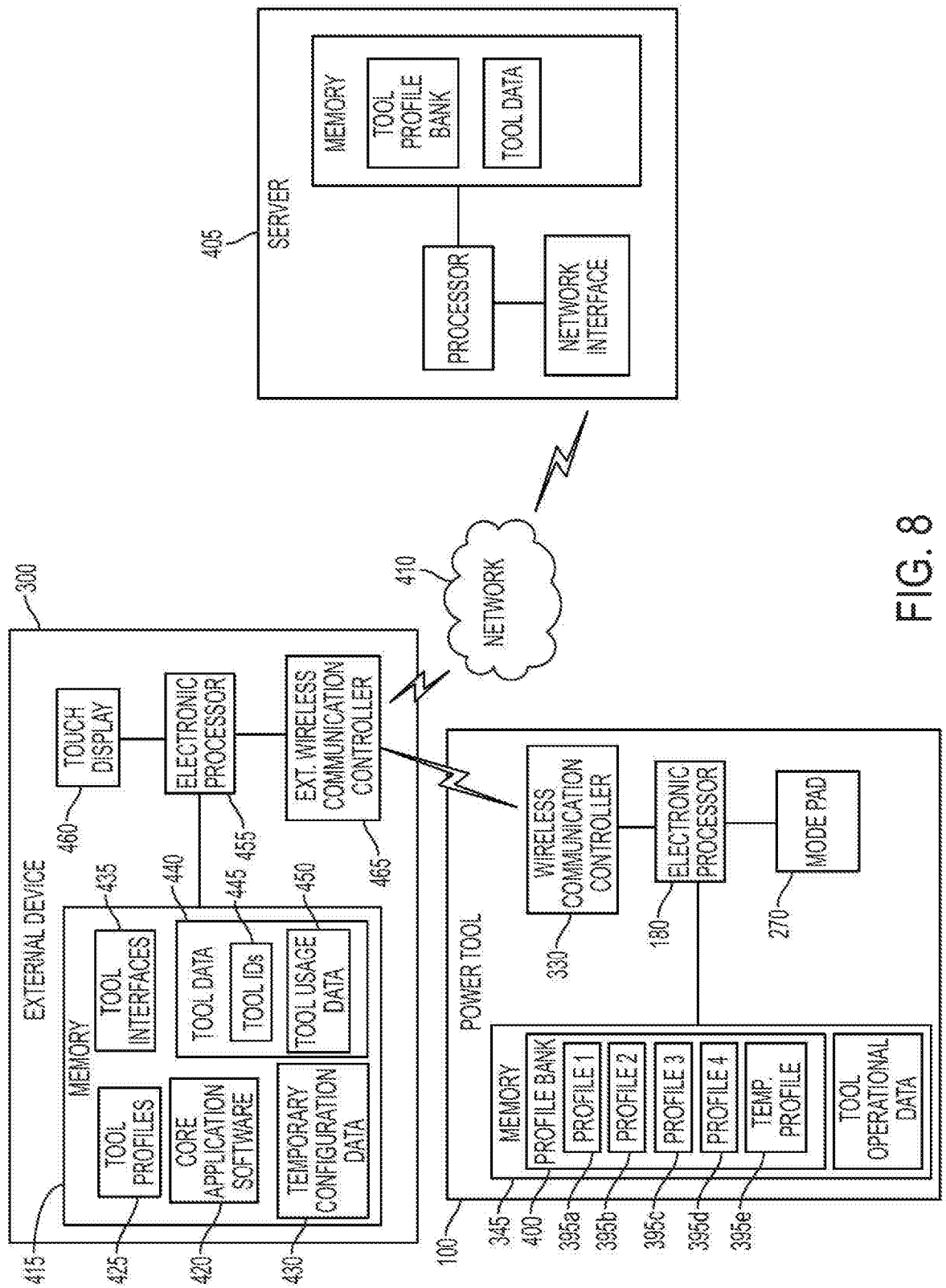
FIG. 8 illustrates a schematic diagram of a communication system including the power tool shown in FIG. 1.

With reference to FIG. 8, modes one, two, three, four, and adaptive of the power tool 100 are each associated with a mode profile configuration data block (a "mode profile") 395a-e, respectively, saved in a memory 345 in a profile bank 400. Each mode profile 395 includes configuration data that defines the operation of the power tool 100 when activated by the user (e.g., upon depressing the trigger 205). For instance, a particular mode profile 395 may specify the motor speed, when to stop the motor, the duration and intensity of a work light, among other operational characteristics. The adaptive mode is associated with a temporary mode profile 395e saved in the memory 345. In the adaptive mode, the user is able to configure the power tool 100 via an external device 300, as is described in further detail below. Also stored in the memory 345 is tool operational data, which includes, for example, information regarding the usage of the power tool 100 (e.g., obtained via the sensors 310), information regarding the maintenance of the power tool, power tool trigger event information (e.g., whether and when the trigger is depressed and the amount of depression).

The external device 300 may be, for example, a smart phone (as illustrated), a laptop computer, a tablet computer, a personal digital assistant (PDA), or another electronic device capable of communicating wirelessly with the power tool 100 and providing a user interface. The external device 300 provides the user interface and allows a user to access and interact with tool information. The external device 300 can receive user inputs to determine operational parameters enable or disable features and the like. The user interface of the external device 300 provides an easy-to-use interface for the user to control and customize operation of the power tool 100.

The external device 300 includes a communication interface that is compatible with the wireless communication controller 330 of the power tool 100. The communication interface of the external device may include a wireless communication controller (e.g., a Bluetooth® module) or a similar component. The external device 300, therefore, grants the user access to data related to the power tool 100, and provides a user interface such that the user can interact with the controller of the power tool device 100.

The external device 300 can also share the information obtained from the power tool 100 with a remote server 405 connected by a network 410. The remote server 405 may be used to store the data obtained from the external device 300, storing the information on the remote server 405 allows a user to access the information from a plurality of different locations. In another embodiment, the remote server 405 may collect information from various users regarding their power tool device and provide statistics or statistical measures to the user based on information obtained from different power tools. The network 410 may include various networking devices (e.g., routers, hubs, switches, cellular towers, wireless connections, wired connections, etc.) for connecting to, for example, the Internet, a cellular data network, a local network, or a combination thereof. In some embodiments, the power tool 100 may be configured to communicate directly with the server 405 through an additional wireless interface or with the same wireless interface that the power tool 100 uses to communicate with the external device 300.

The external device 300 includes a memory 415 storing core application software 420, tool profiles 425, temporary configuration data 430, tool interfaces 435, tool data 440 including received tool identifiers 445, and received tool operation data 450. The external device 300 further includes a processor 455, a touch screen display 460, and an external wireless communication controller 465. The processor 455 and the memory 415 may be part of a controller having similar components as electronic processor 180. The touch screen display 460 allows the external device 108 to output visual data to a user and receive user inputs. Although not illustrated, the external device 108 may include other input devices (e.g., buttons, dials, toggle switches, and a microphone for voice control) and other user outputs (e.g., speakers and tactile feedback devices). Additionally, in some instances, the external device 300 has a display without touch screen input capability and receives user input via other input devices. The external device 300 communicates wirelessly with the wireless communication controller 465, e.g., using a Bluetooth® or Wi-Fi® protocol. The external wireless communication controller 465 includes two separate wireless communication controllers, one for communicating with the wireless communication controller 330 of the power tool 100 (e.g., using Bluetooth® or Wi-Fi® communications) and another for communicating with the server 405 (e.g., using Wi-Fi or cellular communications).

The core application software 420 is executed by the processor 455 to generate a graphical user interface (GUI) on the touch screen display 460 enabling the user to interact with the power tool 100 and communicate with the server 405. In some embodiments, a user may access a repository of software applications (e.g., an "app store" or "app marketplace") using the external device 300 to locate and download the core application software 420, which may be referred to as an "app." The tool profiles 425, tool interfaces 435, or both may be bundled with the core application software 420 such that, for instance, downloading the "app" includes downloading the core application software 420, tool profiles 425, and tool interface 435. In some embodiments, the app is obtained using other techniques, such as downloading from a website using a web browser on the external device 300. As will become apparent from the description below, at least in some embodiments, the app of the external device 300 provides a user with a single entry point for controlling, accessing, and/or interacting with a multitude of power tools of different types. This approach contrasts, for example, with having a unique app for each tool type or for a small grouping of related tool types.

Figure 9:
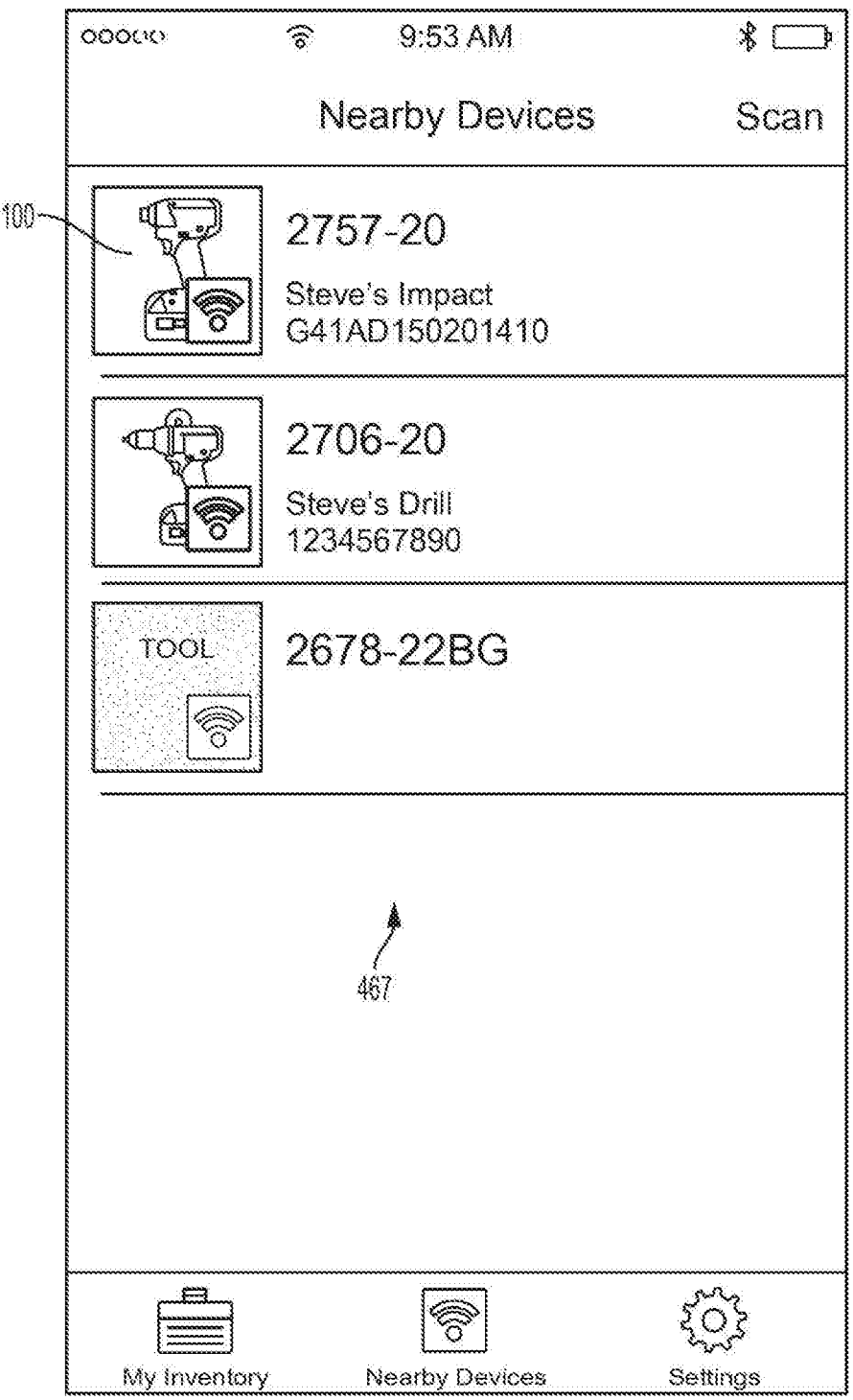
FIGS. 9-11 illustrate exemplary screenshots of a user interface of an external device shown in FIG. 8.

In the illustrated embodiment, the external device 300 scans a radio wave communication spectrum used by the power tool(s) 100 and identifies any power tool(s) 100 within range of the external device 300. As shown in FIG. 9, the external device 300 displays a list 467 of power tools 100 that are within the communication range of the external device 300. The user then selects one of the power tools 100 to communicatively pair with the selected power tool 100. To establish a wireless communication link between the selected power tool 100 and the external device 300, the external device 300 and the power tool 100 exchange identification information. The identification information may include, for example, an identification number for each of the power tool 100 and the external device 300 to enable the devices to recognize each other. The identification information may also determine parameters for the communication between the selected power tool 100 and the external device (e.g., frequency hopping algorithm, number of retransmissions, etc.).

Each type of power tool 100 with which the external device 300 can communicate includes an associated tool graphical user interface (tool interface) stored in the tool interfaces 435. Once the external device 300 and the power tool 100 establish a wireless communication link, the core application software 420 accesses the tool interface 435 to obtain the applicable tool interface for the type of power tool 100 selected. The touch screen display 460 then shows the applicable tool interface. A tool interface includes a series of screens enabling the user to obtain operational data, configure the tool, transmit operating modes to the power tool, and more. Since the power tool 100 has limited space for user input buttons, triggers, switches and dials, the external device 300 and the touch screen display 460 provide an extended user interface for the power tool 100, providing further customization and configuration of the power tool 100 than otherwise possible or desirable through physical user interface components on the power tool 100.

Figure 10:
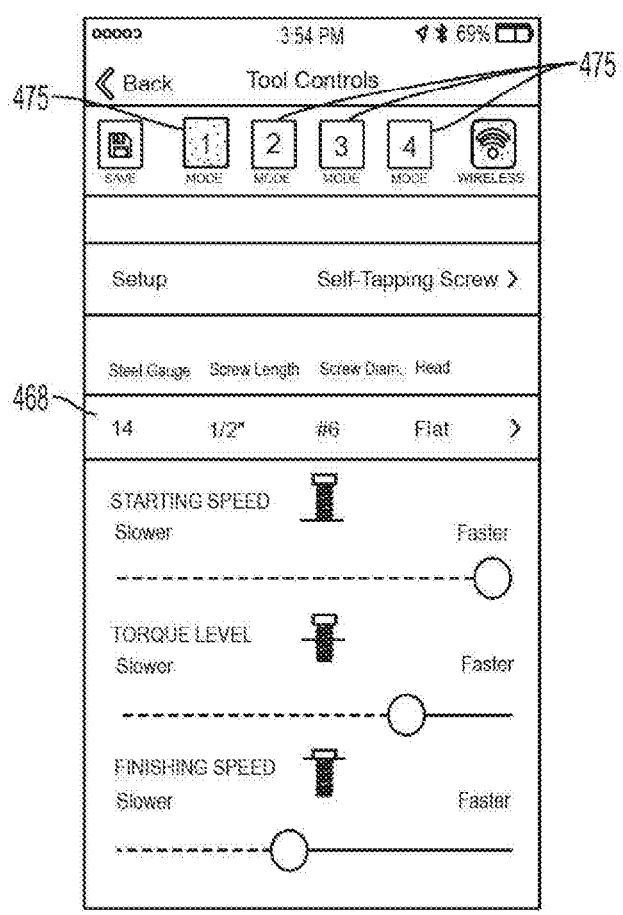

As described above, the power tool 100 can operate in four modes and an adaptive mode. The mode profile assigned to (e.g., or associated with) each operating mode of the power tool 100 can be set through the external device 300. When the power tool 100 is in modes one, two, three, or four, the user can view the mode profile assigned to each of the modes. For example, when the power tool 100 is in modes one-four, the external device 300 can display the mode profile associated with a selected mode as shown in FIG. 10. FIG. 10 shows that mode one is programmed as a self-tapping screw mode and shows the operational parameters 468 associated with the self-tapping screw mode. While the power tool 100 is in modes one-four, however, the user cannot change the mode profile assigned to a particular mode on the power tool 100.

Figure 11:
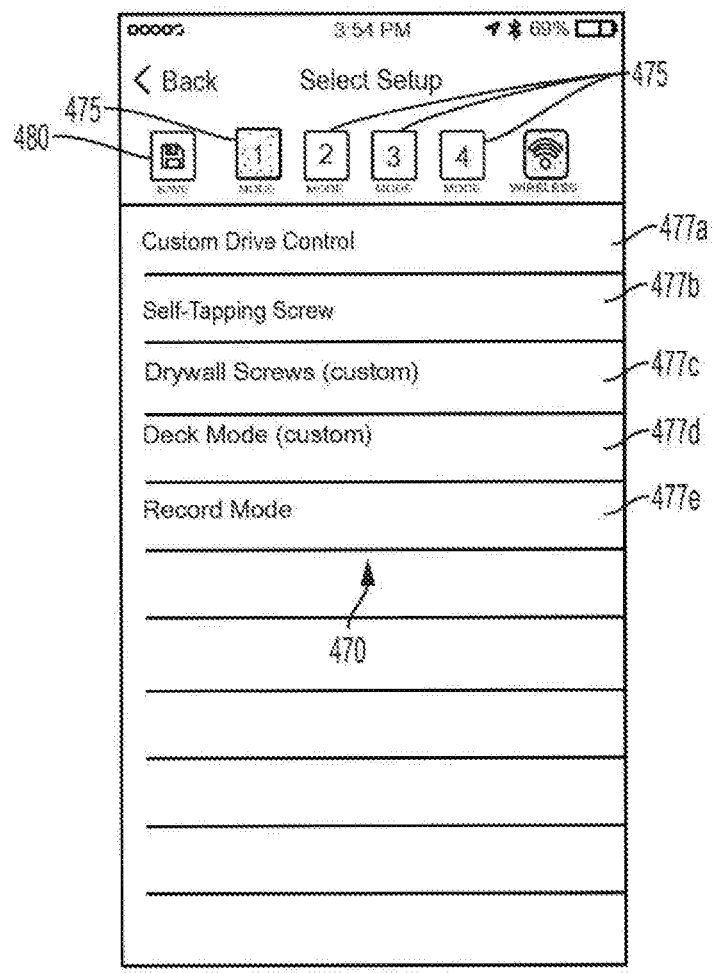

By contrast, when the power tool 100 is in the adaptive mode, the user can view the mode profile assigned to each of the modes, change the parameters associated with each and/or any of the mode profiles assigned to the modes, assign a new mode profile to a mode on the power tool, and/or save a new mode profile. As shown in FIG. 11, when the power tool 100 is in the adaptive mode, the external device 300 generates and displays a tool control screen 470 displayed to the user to select and change the modes available on the power tool 100. The tool control screen 470 includes a plurality of mode profile buttons 475 (e.g., mode 1, mode 2, mode 3, or mode 4) and a wireless communication indicator 480. The wireless communication indicator 480 indicates to the user that the external device 300 is in communication with the power tool 100. While the power tool 100 is in the adaptive mode, the user can select any one of the mode profile buttons 475. The currently selected mode profile that is shown on the control screen becomes the temporary profile 395e on the power tool 100. Additionally, when the power tool 100 is in the adaptive mode, the power tool 100 is operated according to the temporary profile 395e. The source of the mode profile data in the temporary profile 395e (and what is being displayed on the external device 300) varies. Initially, upon entering the adaptive mode via the mode pad 270, the profile 395a (associated with mode 1) is copied into the temporary profile 395e of the power tool 100. Thus, after a user causes the power tool 100 to enter the adaptive mode using the mode pad 270, the power tool 100 initially operates as if mode one was currently selected. Additionally, as the control screen 470 displays the profile saved as the temporary profile 395e, the profile 395a that was just copied to the temporary profile 395e is shown on the external device 300.

In some embodiments, another mode profile 395 (e.g., 395b-d) is copied into the temporary profile 395e upon first entering the adaptive mode and is provided (as the temporary profile 395e) to the external device 300 for populating a control screen (e.g., similar to the control screen shown in FIG. 10). In still other embodiments, the external device 300 displays a default control screen with default profile data for the particular type of power tool, and the external device 300 does not first obtain the profile data form the power tool 100. In these instances, the default profile is sent to the power tool and saved as the temporary profile 395e.

Further, assuming that the power tool 100 is in the adaptive mode, a user may select a profile type not currently assigned to any of the modes on the power tool 100. As shown in FIG. 11, the external device 300 generates a list of mode profiles 477a-e available to be assigned to the selected mode. These mode profiles can be assigned and re-assigned to different modes on the power tool 100. The external device 300 updates the power tool 100 regarding which mode profiles are accessed when a particular mode is selected on the power tool 100. The power tool 100 then operates according to the assigned mode profile for the specific mode selected on the power tool 100.

Figure 12:
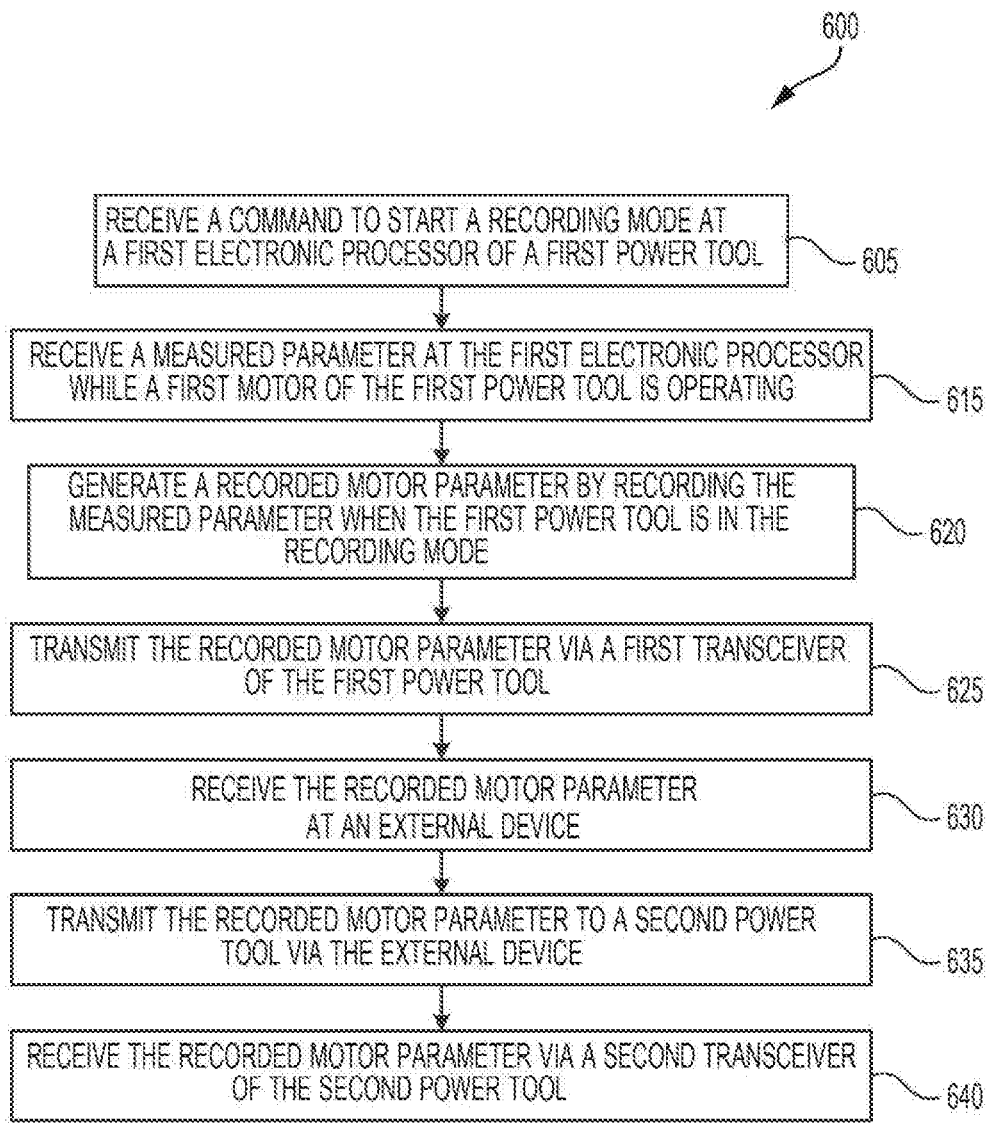
FIG. 12 is a flowchart illustrating a method of transferring a recorded motor parameter from a first power tool to a second power tool.
Figures 23A, 23B:
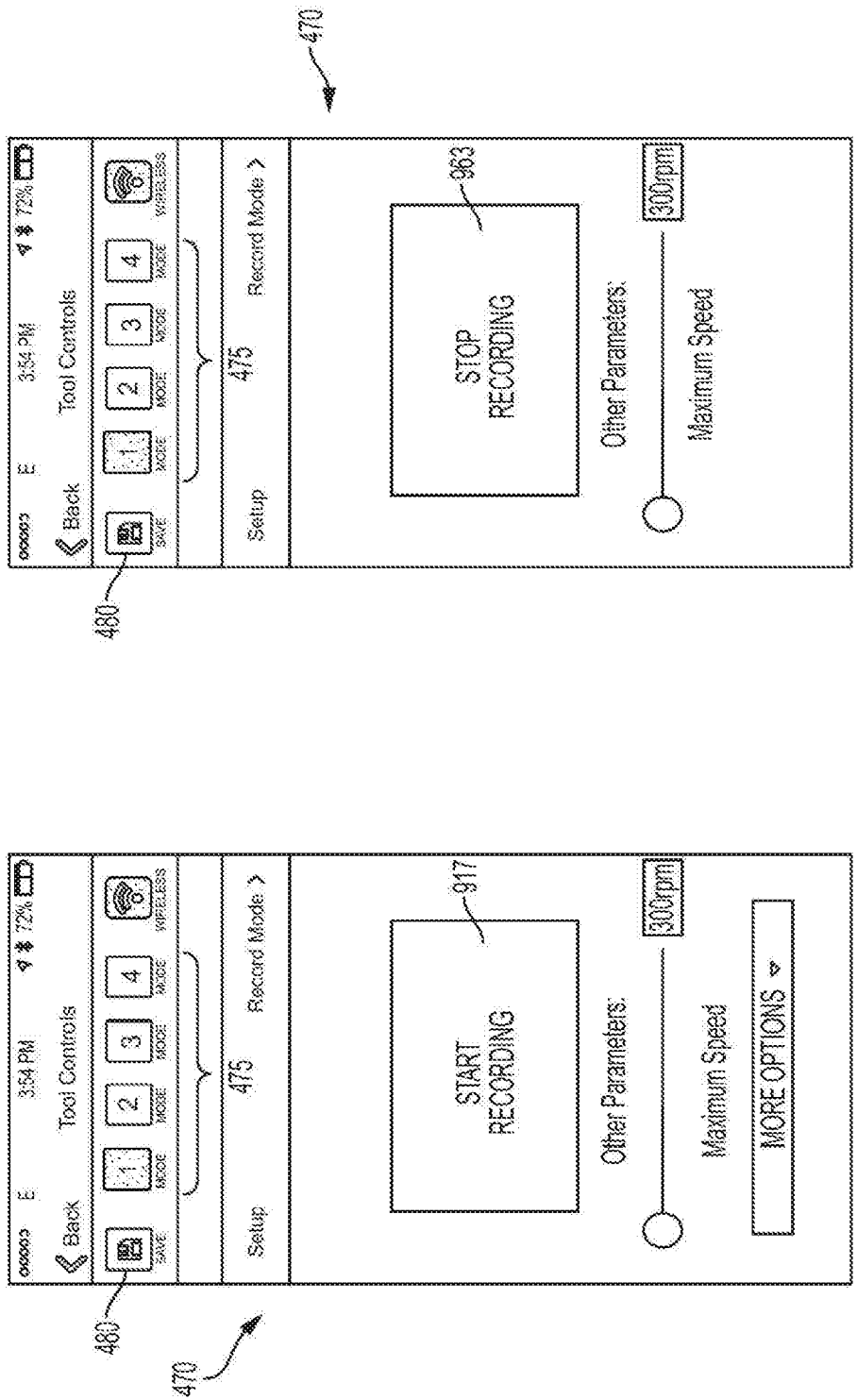
FIGS. 23A-B illustrate exemplary start and stop actuators generated by the user interface of the external device shown in FIG. 8.

For example, in the illustrated embodiment, the recording mode 477e is selected and the temporary profile 395e is then associated with the recording mode 477e. With reference to the method 600 of FIG. 12, which illustrates a method of transferring a recorded motor parameter from the first power tool to the second power tool, this selection and association is an example of receiving of a command to start a recording mode at a first electronic processor of a first power tool (the power tool 100) (step 605). In other embodiments, the command to start the recording mode may include a selection of the recording mode through a first mode pad (e.g., similar to the mode pad 270 of FIG. 6). While the power tool 100 is in the recording mode 477e, the power tool 100 begins a recording session and records the operation of the power tool 100. In the illustrated embodiment, during the recording session, data from a desired motor parameter is measured, and the electronic processor 180 of the power tool 100 receives a measured parameter (e.g., corresponding to the desired motor parameter) while the motor 170 of the power tool 100 is operating (step 615). The measured parameter is also recorded from the start of the recording session until the end of the recording session, and a recorded motor parameter is thereby generated when the power tool 100 is in the recording mode (step 620). According to embodiments of the invention, the motor parameter signals that are measured and recorded during the recording mode may include PWM duty cycle (amount of trigger pull), the speed of the motor, the torque of the motor, the power to the motor, the number of impact "blows," and other motor parameters. Further details regarding recording motor parameters while in the recording mode, including starting and stopping the recording, are provided below. In the illustrated embodiment, the user can set parameters that affect the operation of the power tool 100 while in the recording mode. For example, the user may set the maximum speed of the motor to be 300 rpm, such that during the recording session, the power tool 100 does not exceed the maximum speed of the motor of 300 rpms. In some embodiments, the user can change the parameters associated with the power tool while the power tool 100 is in the middle of the recording session (FIGS. 23A-B).

During the recording of the motor parameter, the external device 300 may generate a display to indicate to the user that the power tool 100 is currently recording the motor parameter. The display generated by the external device 300 may include for example a bar that is filled as the power tool 100 continues to record, a display of the recorded motor parameter, and/or may include text reading, for example, "recording."

Figure 21:
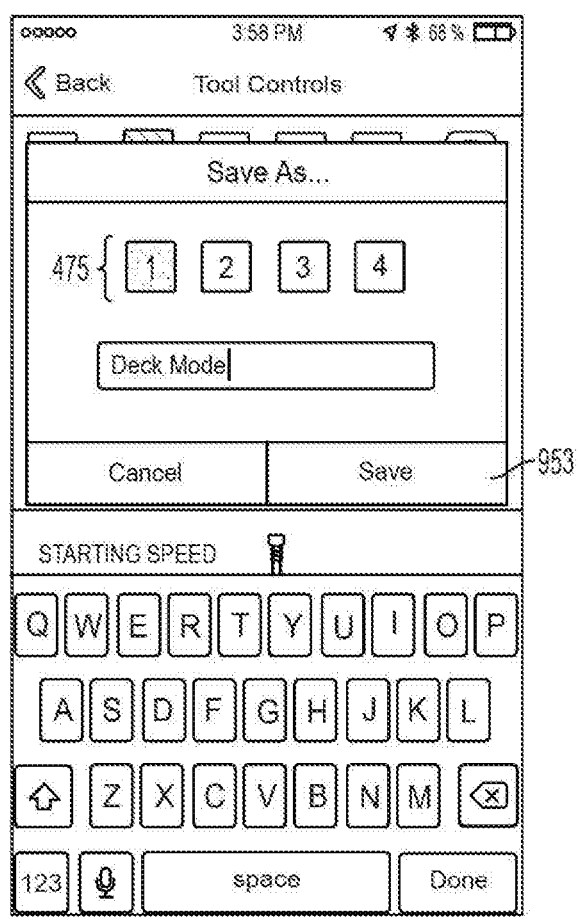
FIG. 21 illustrates an exemplary screenshot of a user interface of the external device shown in FIG. 8.

In some embodiments, at the end of the recording session, the power tool 100 transmits the recorded operation of the power tool to the external device 300 such that, instead of the external device 300 sending the operational parameters to the power tool 100, the external device 300 receives a recorded operation of the power tool 100 from the power tool 100. For example, in step 625, the electronic processor 180 controls the transceiver 375 of the power tool 100 to transmit the recorded motor parameter to the external device 300. The recorded motor parameter is then received by the external device 300 (step 630). Once the external device 300 receives the recorded operation of the power tool 100, a user can click a save button also located on the tool control screen, assign a name to the recorded operation of the power tool 100, and associate the recorded operation of the power tool 100 with one of the modes as shown in FIG. 21. In the illustrated embodiment, the power tool 100 exits the recording mode when the recorded motor parameter is saved as a new mode profile and the external device 300 can re-direct the user to the control screen 470 shown in FIG. 11. If the user does not wish to save the recorded motor parameter, the user can discard the recorded portion and record again, or the user can navigate back to the control screen shown in FIG. 11 or another control screen displayed by the external device 300.

In some embodiments, the external device 300 then updates the power tool 100 of the assignment of a mode profile (in this example, the recorded operation of the power tool) with mode 1 of the power tool 100 through the wireless communication link. Thereafter, the power tool 100, when operating in mode 1, replicates the operation of the power tool during the recording mode.

Figure 13:
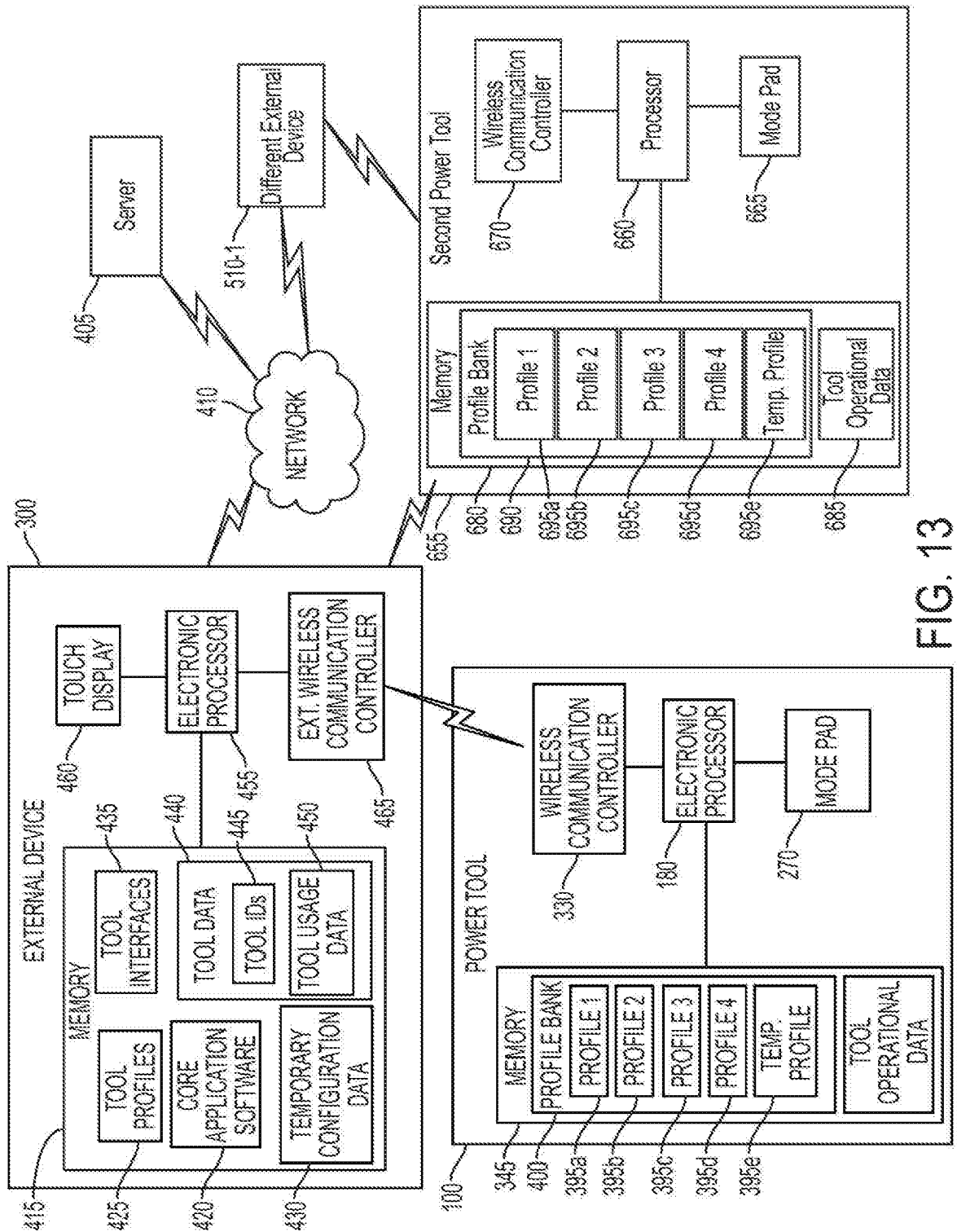
FIG. 13 illustrates a schematic diagram of a communication system including a first power tool and a second power tool.

As noted, a user can save a new mode profile incorporating the recorded motor parameter. The new mode profile may be named by a user via the external device 300 and then exported and saved on the server 405 in the tool profile bank and/or saved locally on the external device 300 (e.g., in the tool profiles 425). Thereafter, a user can connect the external device 300 to the power tool 100 or to another power tool similar to power tool 100, retrieve the saved new mode profile include the recorded motor parameter, and then transmit and assign the saved new mode profile to the selected power tool. For example, the external device 300 transmits (via the external wireless communication controller 465) the recorded motor parameter (e.g., as part of a profile) to a second power tool (step 635). In some embodiments, the external device 300 saves the recorded motor parameter locally (e.g., in the memory 415) and provides that recorded motor parameter to the second power tool before (or without) sending the recorded motor parameter for storage on the server 405 and later retrieval. With reference to FIG. 13, a system 650 including the external device 300, the power tool 100, and an example of a second power tool 655 that receives the recorded motor parameter from the external device 300 is illustrated. The second power tool 655 is similar to the power tool 100 in function and structure as described with respect to FIGS. 1-8 (including, for example, the components as illustrated in FIGS. 6-7), but only select features of the power tool 655 are illustrated in FIG. 13. Like parts between the power tool 100 and the second power tool 655 are given like names, but with updated labels. More particular, the second power tool 655 includes a processor 660, a mode pad 665, a wireless communication controller 670, and a memory 580 having tool operational data 685 and a profile bank 690. The profile bank includes profiles 695a-d and a temporary profile 695e.

The second power tool 655 receives the recorded motor parameter at a second transceiver of wireless communication controller 670 (step 640). The recorded motor parameter may be assigned to a mode of the second power tool 655 and then played back, as described elsewhere herein with respect to the similarly configured power tool 100 (see, e.g., FIGS. 15-17).

Further still, a user having a different external device (e.g., external device 510-1), which is similar to the external device 300 (e.g., has similar components as previously described with respect to the external device 300), may retrieve the saved new mode profile from the server 405 or from the external device 300. The different external device can then transmit and assign the saved new mode profile to the power tool 100 or to another other power tool. Accordingly, a user can record a motor parameter and create a new profile for use on the power tool 100 as well as on other tools, and for sharing with other users to use on their other tools.

Figure 14:
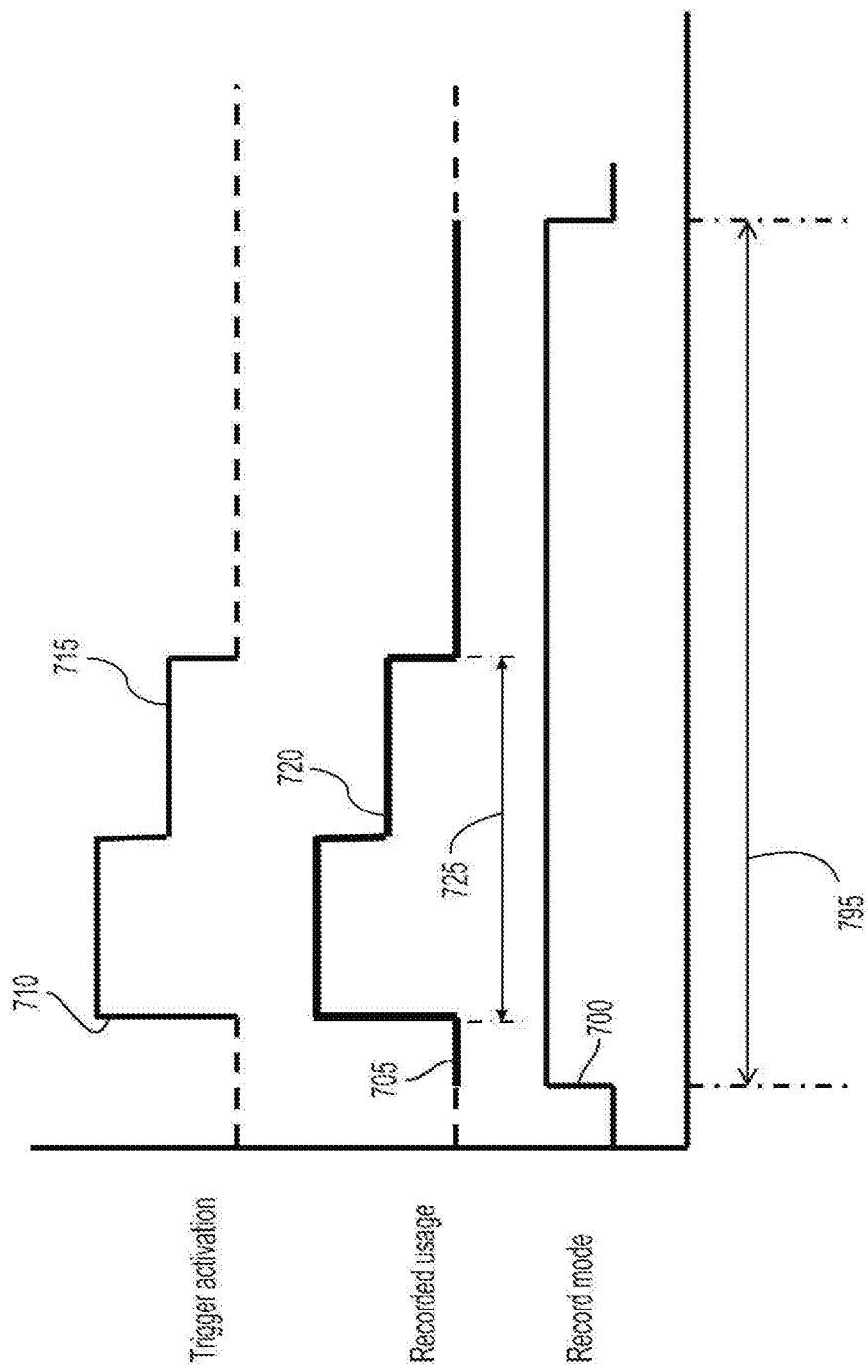
FIGS. 14-19 illustrate operational schematic diagrams of the tool shown in FIG. 1.

The recording mode may operate in various ways. For example, after selecting the recording mode 477e on the external device 300, the user may use different methods to start and end the recording session (i.e., indicate when to start and stop recording), and the power tool 100 may additionally be configured to start and/or stop the recording session based on different factors. FIG. 14 illustrates an exemplary operation of the power tool 100 during the recording mode. In the illustrated embodiment, the recording mode is a timed mode. In other words, once the recording mode is initiated (e.g., by selecting the recording mode 477e on the control screen 470), the recording session is configured to last a specific time period 495. In the timed mode, data for the desired motor parameter is measured (e.g., the measured motor parameter is generated) whether or not there is an activation signal from the trigger mechanism 195. Accordingly, during periods in which there is no trigger activation that causes activation of the motor 170, the data for the desired recorded motor parameter is measured and recorded even if the measured data results in values that do not cause activation of the motor.

As illustrated in FIG. 14, when the recording mode is a timed mode, the power tool 100 begins recording the usage of the motor parameter at a start 700 of the recording mode (i.e., the recording session starts at the same time the recording mode is entered), even if no activation signal from the trigger 205 is received at the start 700 of the recording mode (see section 705). When the trigger assembly is activated at 710, the motor parameter signal 715 that is changed thereby is measured and recorded during the recording of the usage. The resulting recorded motor parameter signal 720 is stored and used during playback as described herein below. The recorded motor parameter signal 720 may be stored in its entirety including the blank or null portions for which no motor control parameter was manipulated or recorded during the recording mode or maybe truncated to the portion 725 for which the motor control parameter signals 715 were recorded during the recording mode. The truncation may occur after recording for storage and later playback or may be truncated during the playback mode.

Figure 15:
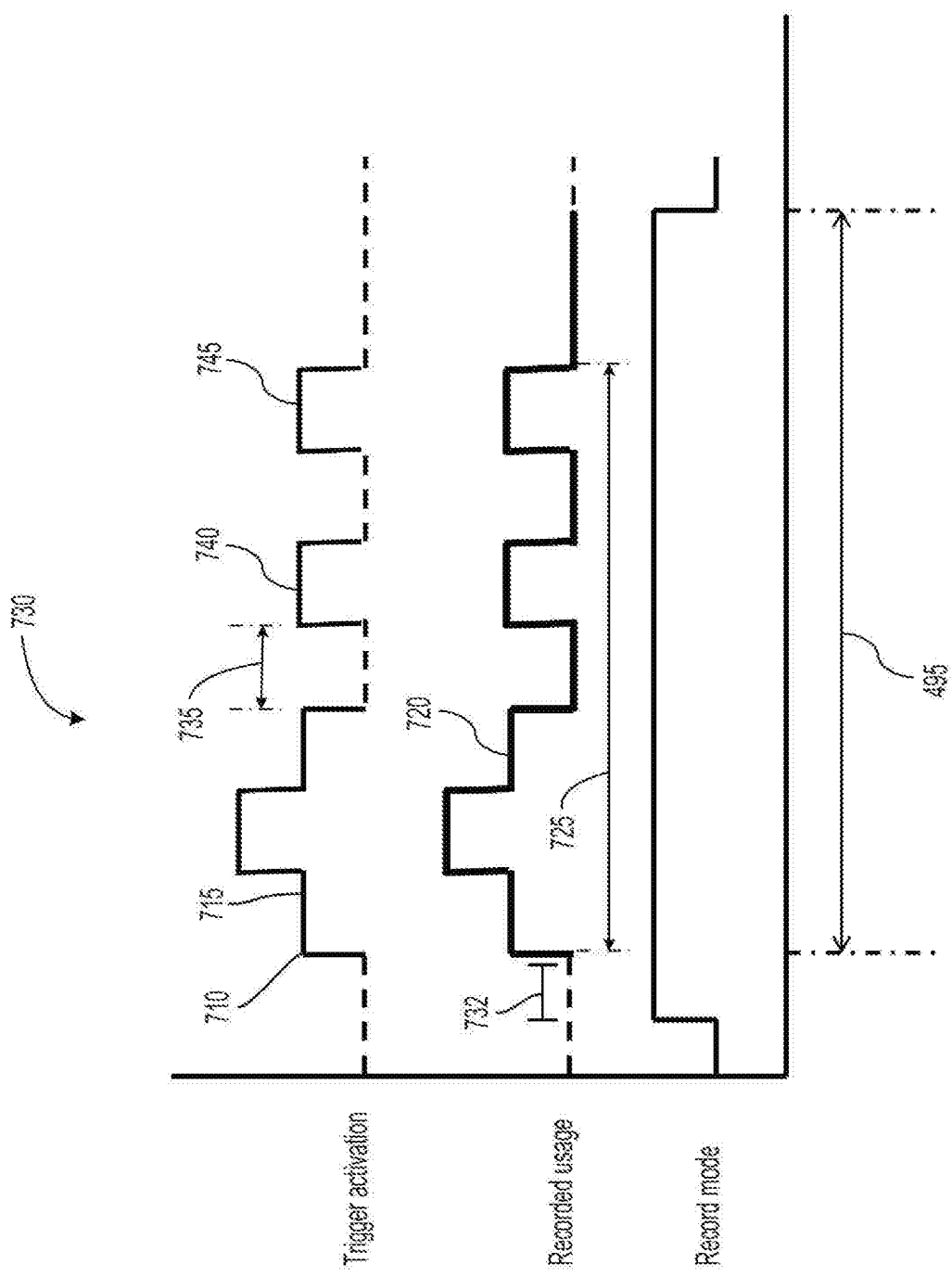

FIG. 15 illustrates a pulse diagram 730 for an operation of the electronic processor 180 during a recording mode according to another embodiment of the invention. In the embodiment of FIG. 15, the recording mode comprises a timed mode, with a recording session having a duration 495, in which data from the motor parameter signal 715 is measured and recorded from the start of the trigger activation at 710 until the end of the recording session. As shown in FIG. 15, section 732 illustrates a time period during which the power tool 100 is in the recording mode, yet the electronic processor 180 does not record the motor parameter signal 715 because the trigger 205 is not yet activated. In this mode, data for the motor parameter signal 715 is measured beginning from when the trigger is first activated at 710 (e.g., marking the start of the recording session) and continues whether or not there is an activation signal from the trigger 205 until the end of the recording session (e.g., the end of the time period 495). Accordingly, during periods in which there is no trigger activation (e.g., time period 735) that causes activation of the motor 170 once the recording session has begun, the data for the desired recorded motor parameter is measured and recorded even if the measured data results in values that do not cause activation of the motor 170.

As illustrated in FIG. 14, the start of recording mode begins the recording session (i.e., recording the usage of the motor parameter signal 715) at the first activation of the trigger 205 at 710. When the trigger 205 is activated at 710, the motor parameter signal 715 that is changed thereby is measured and recorded during the recording of the usage. Since recording continues after the first trigger activation at 710 even when there is no activation of the trigger (e.g., during period 735), subsequent trigger activation pulses 740 and 745 are also recorded, which may occur through a user's preference of pulsing an impact tool, for example, after seating a fastener. The resulting recorded motor parameter signal 720 is stored and used during playback as described herein below. The recorded motor parameter signal 720 may be stored in its entirety including the blank or null portions for which no motor control parameter was manipulated or recorded during the recording session or may be truncated to the portion 725 for which motor control parameter signals 715 were recorded during the recording session. The truncation may occur after recording for storage and later playback or may be truncated during the playback of the recorded motor parameter.

Figure 16:
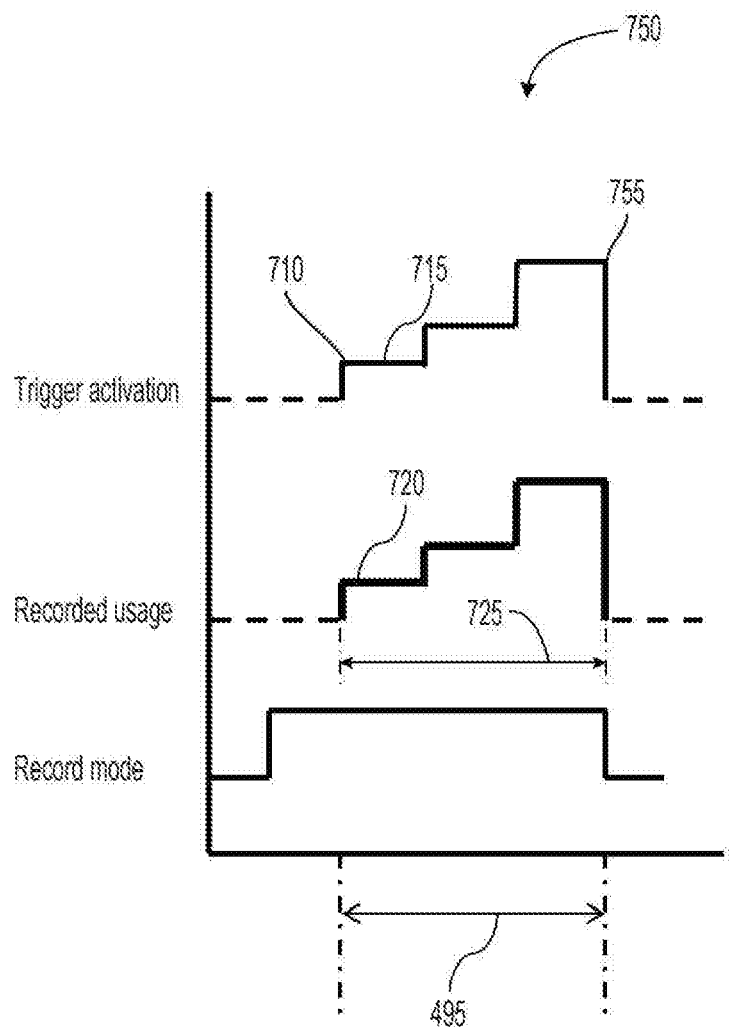

FIG. 16 illustrates a pulse diagram 750 for an operation of the electronic processor 180 during a recording mode according to another embodiment of the invention. According to the embodiment illustrated in FIG. 16, the recording mode comprises a trigger-recording mode in which data from the motor parameter signal 715 is measured and recorded from the start of the trigger activation at 710 (i.e., the start of the recording session) until the end of the single trigger activation event at 755 (i.e., the end of the recording session). In this mode, data for the motor parameter signal 715 is measured beginning from when the trigger 205 is first activated at 710 and terminates when the activation signal from the trigger 205 is first ended at 755. Accordingly, the data for the motor parameter signal 715 is measured and recorded only during the first, single trigger activation signal.

As illustrated in FIG. 16, while in the recording mode, the recording session begins at the first activation of the trigger assembly at 710. When the trigger assembly is activated at 710, the motor parameter signal 715 that is changed thereby is measured and recorded during the recording of the usage. Since the recording session stops after the first trigger activation, subsequent trigger activation pulses are not recorded. The resulting recorded motor parameter signal 720 is stored and used during playback as described herein below.

As discussed above, the power tool 100 transmits the recorded motor parameter signal 720 to the external device 300 for storage as a new mode profile. In some embodiments, the wireless communication controller 330 transmits the recorded motor parameter signal 720 to the external device 300 in real-time. In other words, as the electronic processor 180 records the motor parameter signal 715, the wireless communication controller 330 transmits the recorded motor parameter signal 720 to the external device 300, such that at the end of the recording session, the recorded motor parameter signal 720 is recorded at both the electronic processor 180 and at the external device 300. In such embodiments, the external device 300 may generate, for example, a graph display graphing the recorded motor parameter signal 720 over time.

In other embodiments, the wireless communication controller 330 transmits the recorded motor parameter signal 720 to the external device 300 at the end of the recording session (e.g., at the end of the time period 495 and/or at the end of the trigger signal at 755 of FIG. 16). In such embodiments, once the recording session ends, the wireless communication controller 330 automatically transmits the recorded motor parameter signal 720 to the external device 300. The external device 300 then saves the recorded motor parameter signal 720 as a new mode profile 425 available to the power tool 100.

In yet other embodiments, the wireless communication controller 330 transmits the recorded motor parameter signal 720 to the external device 300 when the wireless communication controller 330 receives a request from the external device 300 for the recorded motor parameter signal 720. In such embodiments, the electronic processor 180 stores the recorded motor parameter signal 720. The user then establishes a communication link between the power tool 100 and the external device 300 and requests, through an input to the external device 300, that the recorded motor parameter signal 720 be transmitted to the external device 300. The wireless communication controller 330 then transmits the recorded motor parameter signal 720 to the external device 300, which then saves the recorded motor parameter signal 720 as a new mode profile 425.

In some embodiments, the wireless communication controller 330 can transmit the recorded motor parameter signal 720 in each of the methods described above (e.g., in real-time, after recording session ends, and upon receipt of a request signal from the external device 300). In such embodiments, the user may select when and how the recorded motor parameter signal 720 is transmitted to the external device 300 by adjusting settings of the recording mode (e.g., using the external device 300).

Figure 17:
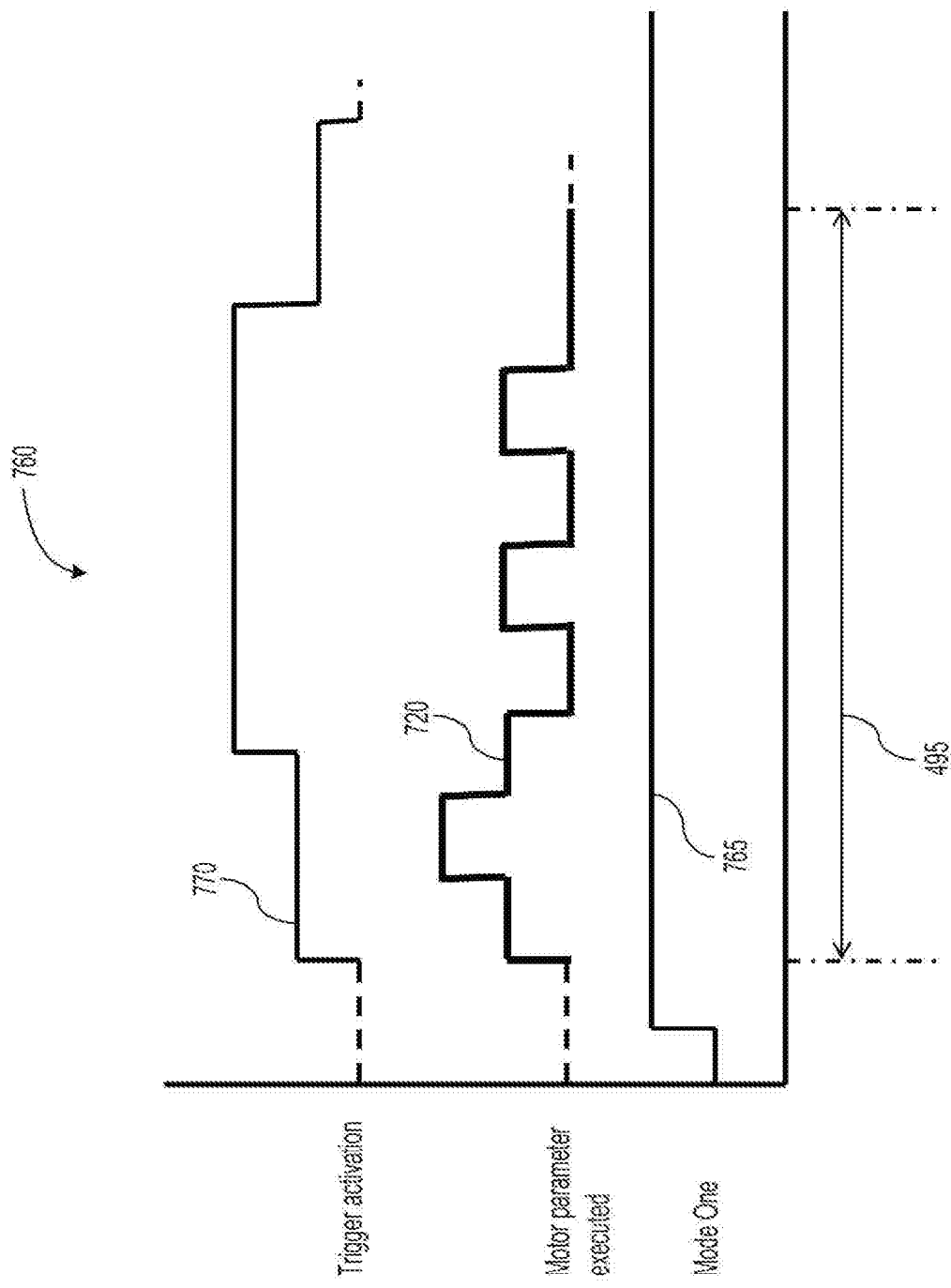

Once the recorded motor parameter is saved as a new mode profile and is assigned to a mode on the power tool 100, the power tool 100 can operate according to the recorded motor parameter signal 720. FIG. 17 illustrates a pulse diagram 760 for an operation of the electronic processor 180 according to the recorded parameter signal 720 according to one embodiment of the invention. As an example, the recorded motor parameter signal 720 of FIG. 15 is used for the pulse diagram 760 of FIG. 17, and is assigned to mode one of the power tool 100. The electronic processor 180 is placed in mode one via the mode pad 270. While the power tool 100 is in mode one 765 but does not begin executing the recorded motor parameter signal 720 until activation of the trigger 205 begins at 770.

As illustrated, activation of the trigger at 770 begins execution (or playback) of the recorded motor parameter signal 720 according to what was recorded and stored during the recording mode of pulse diagram 730. While the trigger activation pulse 770 does not match the executed recorded motor parameter signal 720, execution of the recorded motor parameter signal 720 allows for repeatability of the recorded parameter even when the trigger activation signal 770 does not match. Accordingly, a different trigger activation signal profile nevertheless causes the recorded motor parameter signal 720 to be executed. In this manner, the recorded motor parameter signal 720 may be reliably repeated for tasks such as motor line assembly scenarios or other such tasks where predictability of tool use is desired. As illustrated, when the recording time period 495 is ended, the executed recorded motor parameter signal 720 is also ended, and even though trigger activation signal 770 illustrates that the trigger mechanism 195 is still being activated, the tool motor 170 is not activated since the recorded motor parameter signal 720 has ended. The recorded motor parameter signal 720 is not executed again until re-activation of the trigger mechanism 195 a subsequent time during playback mode 765 in one embodiment.

According to another embodiment of the invention, the recorded motor parameter signal 720 is repeatedly executed as long as the trigger mechanism 195 is activated. In this manner, for example, a recorded parameter signal (e.g., the recorded motor parameter signal 720) that oscillates the motor parameter between two or more values may continue to oscillate the motor parameter for a longer duration of the trigger activation. As such, a short recorded signal may be extended and be executed many times repeatedly during a long trigger activation time.

Figure 18:
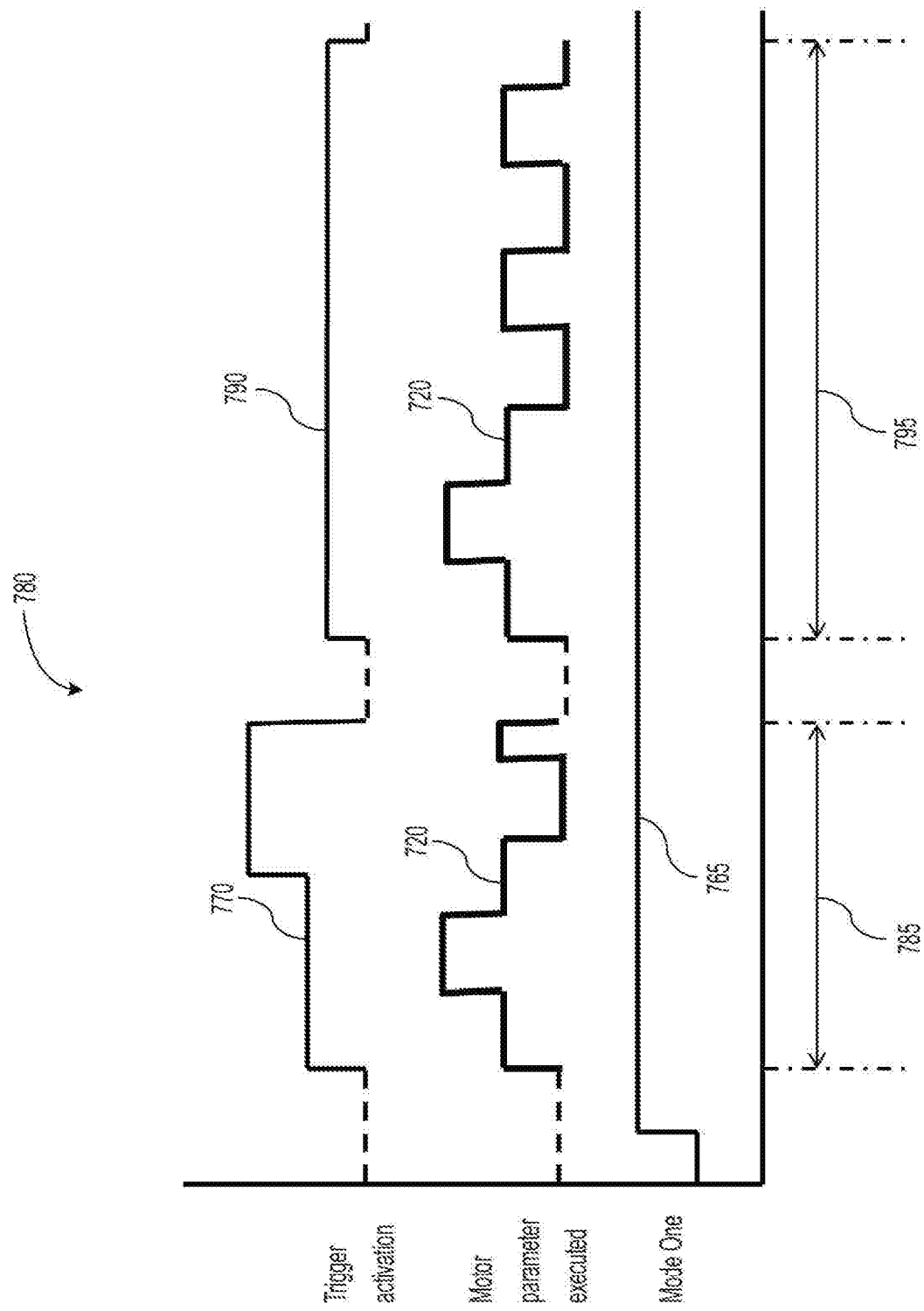

FIG. 18 illustrates a pulse diagram 780 for an operation of the electronic processor 180 according to the recorded motor parameter signal 720 and in mode one according to another embodiment of the invention. As an example, the recorded motor parameter signal 720 of FIG. 15 is used for the pulse diagram 780 of FIG. 18 and the recorded motor parameter is saved as the mode profile for mode one. The electronic processor 180 enters mode one 765 but does not begin executing the recorded motor parameter signal 720 until activation of the trigger begins at 770.

As illustrated, however, at the end of a first trigger activation time 785 that may be caused, for example, by the user releasing the trigger mechanism 195, playback of the recorded motor parameter signal 720 is halted when the trigger mechanism 195 is released. When the trigger mechanism 195 is re-activated during a subsequent trigger activation signal 790, the recorded motor parameter signal 720 is played back from the beginning during a second trigger activation time 795 even though it was halted during the previous execution. In this manner, playback of the recorded motor parameter signal 720 is re-initiated from the beginning each time the trigger mechanism 195 is re-activated.

Figure 19:
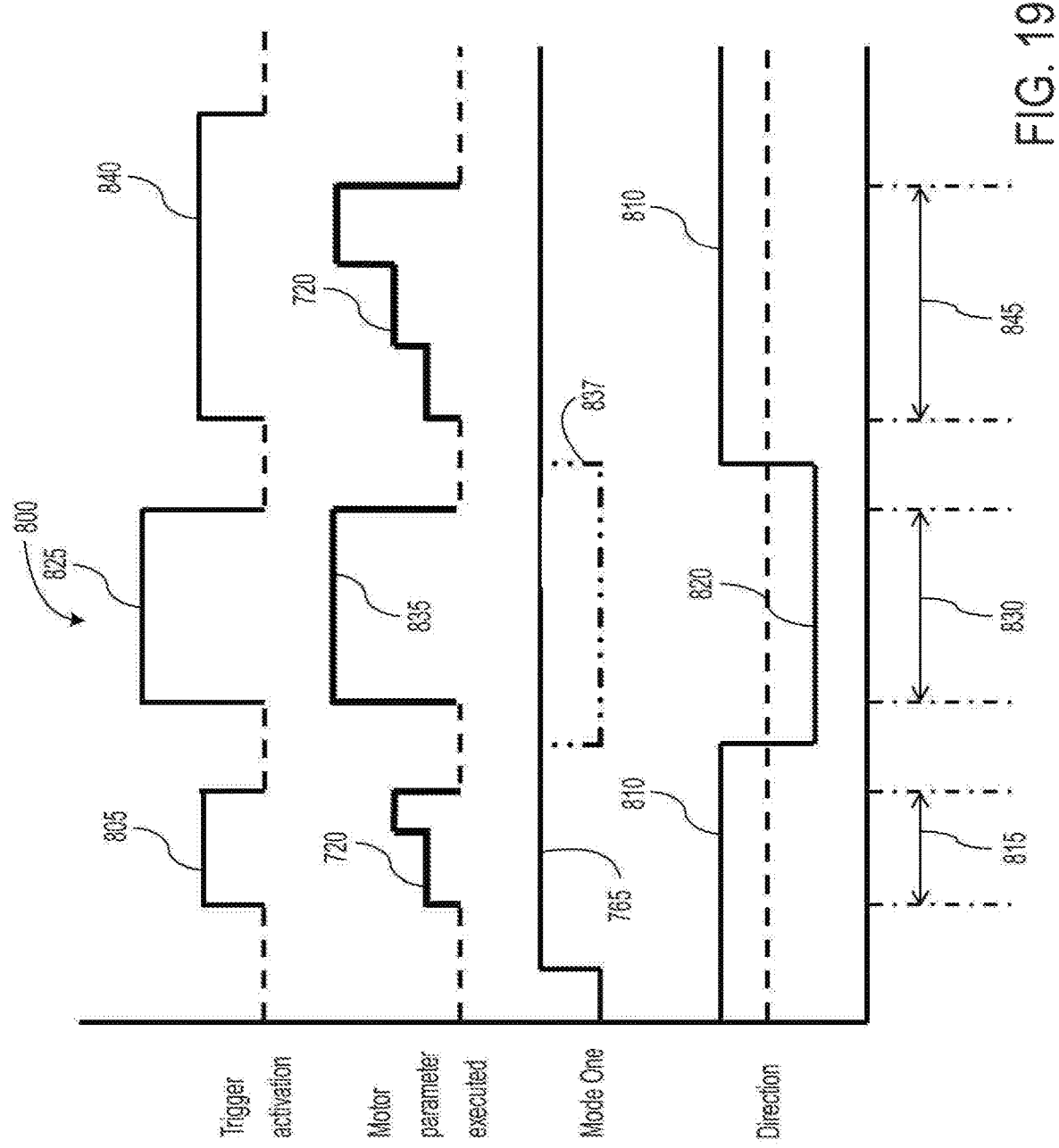

FIG. 19 illustrates a pulse diagram 800 for an operation of the electronic processor 180 according to the recorded motor parameter when saved as the mode profile for mode one, according to another embodiment of the invention. As an example, the recorded parameter signal 720 of FIG. 16 is used for the pulse diagram 800 of FIG. 19. The electronic processor 180 enters mode one 765 but does not begin executing the recorded motor parameter signal 720 until activation of the trigger begins at 805. A direction signal from the direction switch 210 illustrates that the tool 100 is in a forward mode direction 810 at the beginning of the playback mode 765.

Similar to that illustrated in FIG. 18, at the end of a first trigger activation time 815 that may be caused, for example, by the user releasing the trigger mechanism 195, playback of the recorded motor parameter signal 720 is halted when the trigger mechanism 195 is released. For example, the user may stop the trigger activation 805 in order to switch the direction switch 210 to the reverse direction mode 820 in order to engage a fastener to back it out of its current position prior to re-engaging the fastener to drive it forward. During the reverse mode 820, the recorded motor parameter signal 720 is not executed, but instead, the trigger activation signal 825 during a time 830 controls the motor 170 according to a normal operating mode (e.g., not based on the record motor parameter signal 720) such that the motor parameter signal 835 executed during the reverse mode 820 directly corresponds with the trigger activation signal 825. While playback mode 765 is illustrated as continuing to be active throughout the direction change into the reverse mode 820, playback mode 765 may be deactivated as illustrated in phantom at 837 while the reverse mode 820 is engaged. When the forward mode 810 is re-engaged via direction switch 210 and the trigger mechanism 195 is re-activated during a subsequent trigger activation signal 840, the recorded motor parameter signal 720 is played back from the beginning during a second trigger activation time 845 even though it was halted during the previous execution. In this manner, playback of the recorded motor parameter signal 720 is re-initiated from the beginning each time the trigger mechanism 195 is re-activated.

Figure 20:
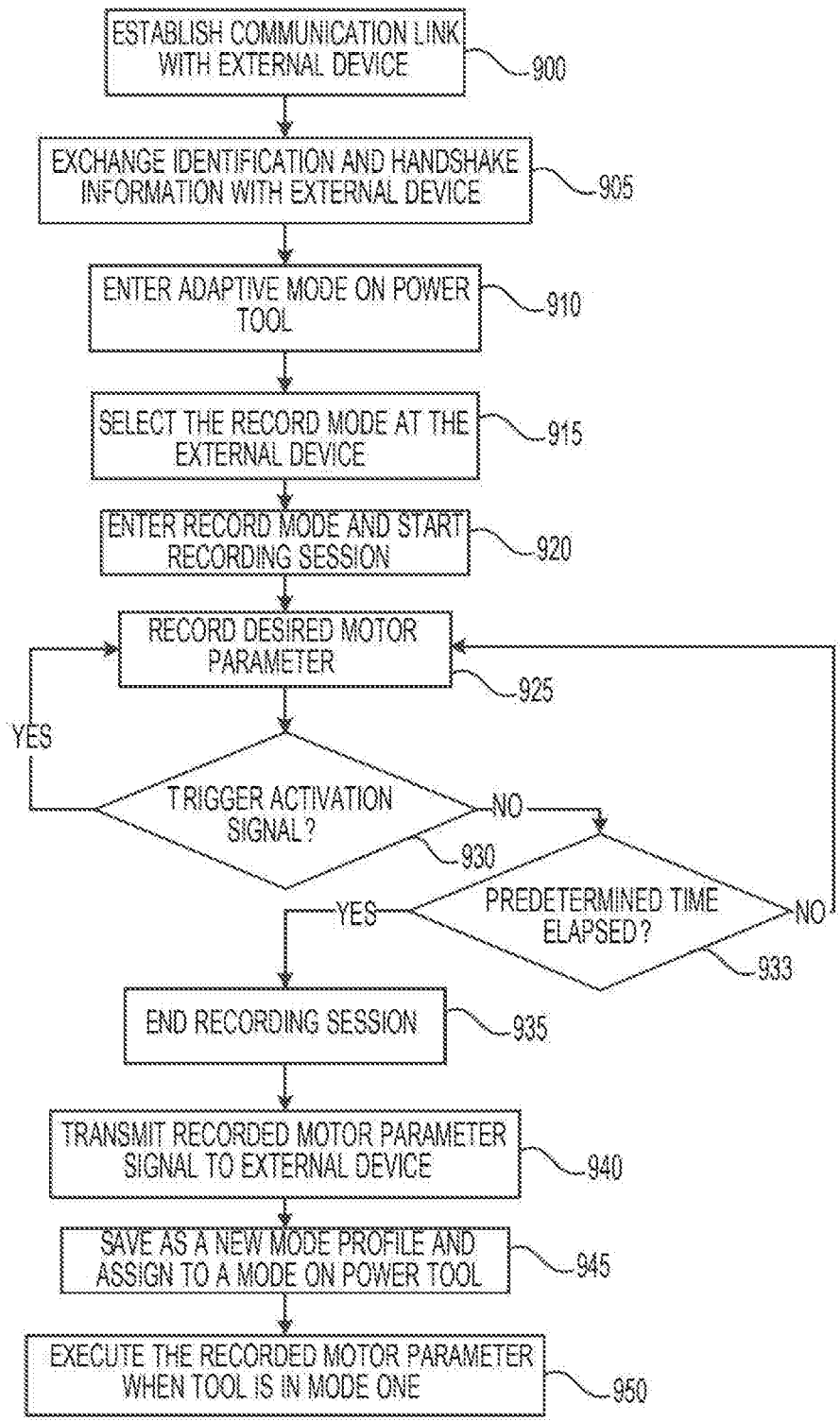
FIG. 20 is a flowchart illustrating one exemplary method of operation of the tool shown in FIG. 1.

FIG. 20 illustrates a method executed by the power tool 100 and the external device 300 to enter the recording mode, exit the recording mode, and operate the power tool 100 according to the recorded motor parameter. As illustrated in FIG. 20, first the wireless communication controller 330 establishes a communication link with the external device 300 (at step 900). The wireless communication controller 330 and the external device 300 exchange identification and handshake information to define the parameters for communication between the wireless communication controller 330 and the external device 300 (step 905). The user then enters the adaptive mode via the mode pad 270 at step 910. The user then selects the recording mode profile 477e at the external device 300 (step 915). Once the tool 100 operates in the recording mode, the electronic processor 180 starts the recording session automatically or after a predetermined period of time (e.g., three (3) seconds) (step 920). During the recording session, the electronic processor 180 records the desired motor parameter as described above (step 925). The power tool 100 then detects the end of the recording session. In the illustrated embodiment the recording session ends after a predetermined time duration of trigger 205 inactivity expires. For example, the electronic processor 180 determines whether a trigger 205 activation signal has been received (step 930). If a trigger activation signal has been received, the electronic processor 180 continues to record the motor parameter. If, on the other hand, the electronic processor 180 does not receive a trigger activation signal, the electronic processor 180 proceeds to determine whether a predetermined time duration (e.g., five (5) seconds) has passed without a trigger activation signal (step 933). If the electronic processor 180 determines that the predetermined time duration has expired and no trigger activation signals are received, the electronic processor 180 ends the recording session (step 935); otherwise, the electronic processor 180 continues the recording session and continues to record the desired motor parameter (step 925). In some embodiments, as described with respect to FIGS. 14-16, the recording session ends after the specified time duration 495 expires. In such embodiments, steps 930-935 are bypassed and the electronic processor 180 monitors the end of the time duration 495 instead.

Once the recording session has ended, the wireless communication controller 330 transmits the recorded motor parameter signal 720 to the external device 300 in the methods described above (step 940). When the wireless communication controller 330 transmits the recorded motor parameter signal 720 to the external device 300, the external device 300 stores the recorded motor operation (e.g., the recorded motor parameter signal 720) as a new mode profile as shown in FIG. 21. The external device 300 may prompt the user to name the recorded motor operation so that the recorded motor operation can be stored as a new mode profile. By naming the recorded motor operation and activating the save actuator 953, the user may access the stored recorded motor operation at a future time. The user can also assign the recorded motor operation (in this example named "Deck Mode") as one of the modes (e.g., mode one) accessible from the power tool 100 (step 945) such that the recording action does not have to be repeated at a future time. When the power tool 100 is then selected to operate in mode one, the electronic processor 180 executes the recorded motor parameter 720 upon activation of the trigger 205 as described with respect to FIGS. 17-19 (step 950).

In the method described with respect to FIG. 20, the power tool 100 continues recording until the end of the recording session, which is caused by the lack of trigger activation signals in a predetermined time duration (e.g., five (5) seconds). The power tool 100 then automatically ends the recording session, exits the recording mode, and prompts the user to save the recorded motor parameter as a mode profile as shown in FIG. 21. In other embodiments, such as the method of FIG. 22, the user interacts with the external device 300 to mark the beginning and end of the recording session.

Figure 22:
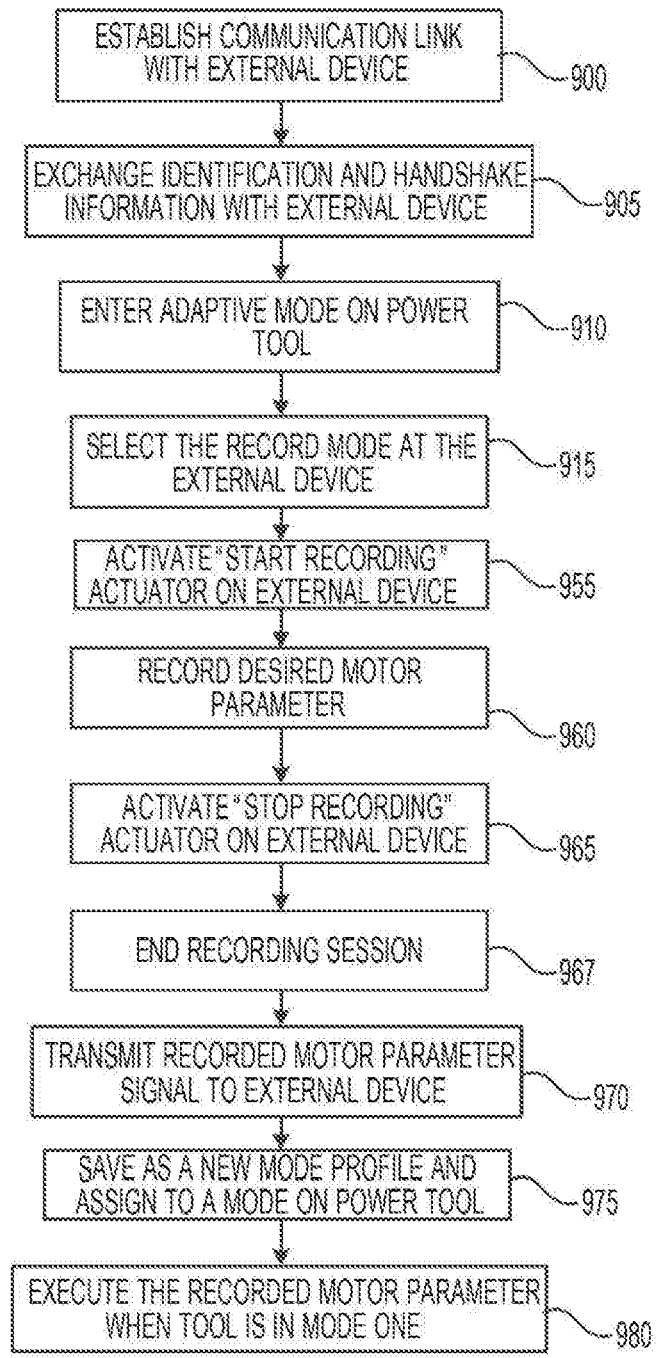
FIG. 22 is a flowchart illustrating a second exemplary method of operation of the tool shown in FIG. 1.

FIG. 22 illustrates a method of the operation for the power tool 100 according to another embodiment of the invention. As shown in FIG. 22, the power tool 100 establishes a communication link with the external device 300 (step 900), exchanges identification and handshake information with the external device 300 to secure the communication link (step 905), and enters the adaptive mode at step 910. The user then selects the recording mode using the external device 300 (step 915). In this embodiment, rather than automatically starting the recording session, the user activates a "start recording" actuator 917 on the external device 300 to indicate the beginning of the recording session, as shown in FIG. 23A (step 955). The external device 300 automatically shows the "start recording" actuator 917 after the user selects the recording mode 477e. In response to receiving the user actuation, the external device 300 sends a start recording signal (e.g., a start recording command) to the power tool 100. The electronic processor 180 receives the start recording signal through the wireless communication controller 330. The user then operates the power tool 100 as desired while the electronic processor 180 records the desired motor parameter as described above (step 960). As discussed above and shown in FIGS. 23A-B, the user can change some of the parameters of the power tool 100 that can affect the operation of the power tool 100 while the power tool 100 is in the recording mode and/or in the recording session. The user then activates a "stop recording" actuator 963 on the external device 300 (FIG. 23B) to indicate the end of the recording session (step 965). In response to receiving the user actuation, the external device 300 sends a stop recording signal (e.g., a stop recording command) to the power tool 100. The electronic processor 180 receives the stop recording signal through the wireless communication controller 330. In response, the electronic processor 180 ends the recording session and stops recording the motor parameter (step 967). In some embodiments, the user activates the "start recording" actuator 917 to initiate the recording session, but the recording session automatically stops as described with respect to FIG. 20 or because the recording mode (e.g., the recording session) is a timed mode with a predetermined time duration (e.g., time duration 495). In such embodiments, step 965 is bypassed.

Once the recording session has ended, the wireless communication controller 330 transmits the recorded motor parameter signal 720 to the external device 300 as described above (step 970). Also, once the recording mode has ended, the user is prompted to save the recorded motor parameter as a new mode profile and assign the mode profile to a mode on the power tool, for example, mode one (step 975). When the power tool 100 is placed in mode one via the mode pad 270, the electronic processor 180 executes the recorded motor parameter 720 upon activation of the trigger 205 as described with respect to FIGS. 17-19 (step 980).

In some embodiments, the power tool 100 also includes a record and playback selector 985 on the power tool 100. The record and playback selector 985 allows a user to assign a "record and playback" mode profile to one of the four modes of the power tool 100 and then control when the power tool 100 switches from a recording mode to a playback mode from the power tool 100 itself. In embodiments including the record and playback selector 985, the power tool 100 can operate in a playback mode in which the desired motor parameter is replicated after the motor parameter has been recorded. For example, if the desired motor parameter is the motor current, the power tool 100 records the current provided to the motor while the power tool 100 is in the recording mode (e.g., the power tool 100 records that at 0.05 seconds, the motor current is 1 Amp, at 0.1 seconds, the motor current is 1.2 A, etc.). Then, during the playback mode, the power tool 100 replicates the operation profile generated during the recording mode such that the power tool 100 replicates the operation of the power tool 100 during the recording mode.

With reference to FIG. 2, the record and playback selector 985 is disposed between the exterior surface 155 and the interior surface 160 of the wall 150 and within a pocket 990 defined by the wall 150. In the illustrated embodiment, the pocket 990 is located proximately to the cavity 162, and the record and playback selector 985 is accessible from the top surface 120 of the housing 105. In other embodiments, the record and playback selector 985 is accessible via another surface of the housing, such as one of the side surfaces 130, 135 or the rear surface 145.

Figure 24A:
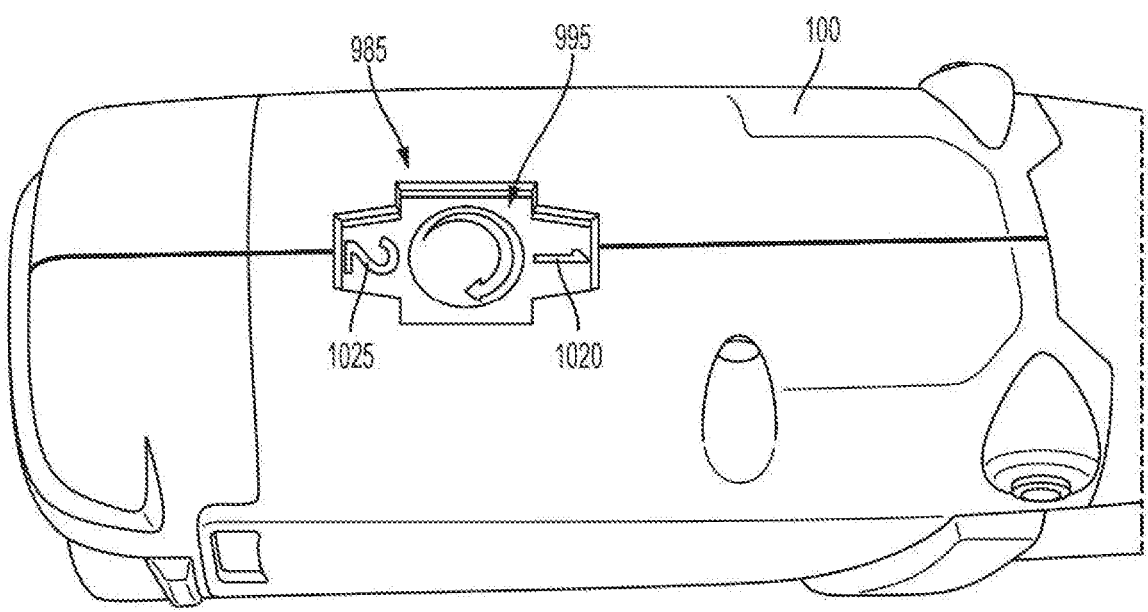
FIGS. 24A-B illustrate a speed selector switch of the tool shown in FIG. 1.
Figure 24B:
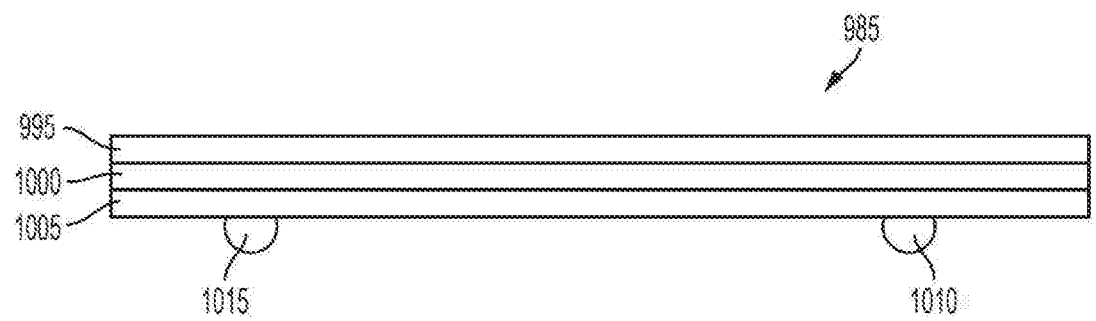

In the embodiment illustrated in FIGS. 24A-B. The record and playback selector 985 is a multi-layer electrical switch including a label layer 995, a push-button 1000, a printed circuit board layer 1005, and light-emitting diodes (LEDs) 1010, 1015. The label layer 995 includes mode indicators 1020, 1025. Mode indicator 1020 indicates to the operator, for example, that a recording mode is selected, and mode indicator 1025 indicates to the operator, for example, that a playback mode is selected. When both indicators 1020 and 1025 are off, the record and playback mode is not selected by the power tool 100 and the power tool 100 operates in a different mode instead (e.g., a self-tapping screw mode). The push-button 1000 is an electrical push-button, and in the illustrated embodiment, the push-button 1000 is a low-profile pop-switch. In some embodiments, the printed circuit board layer 1005 includes a controller having a similar construction as electronic processor 180.

Figure 25:
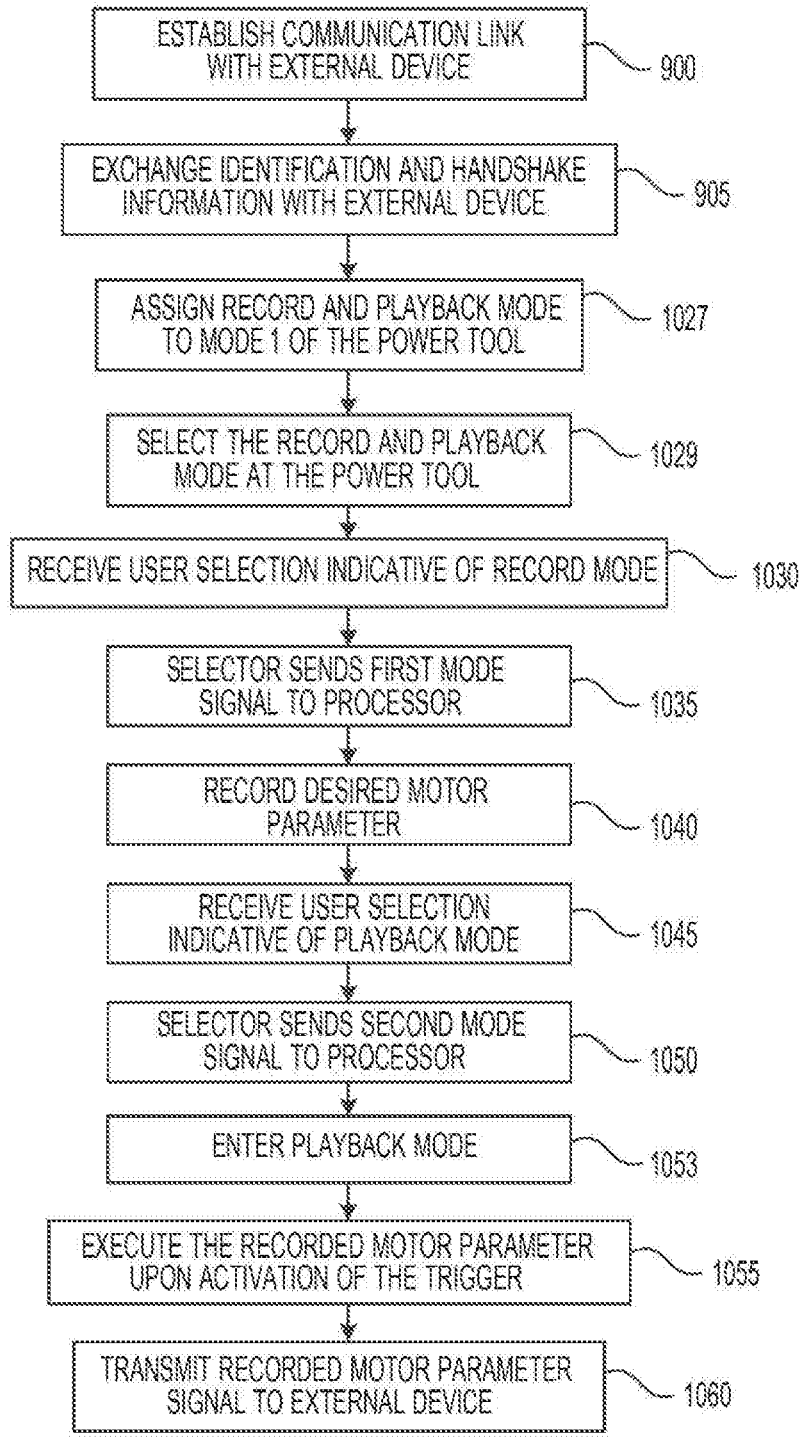
FIG. 25 is a flowchart illustrating a third exemplary method of operation of the tool shown in FIG. 1.

In embodiments in which the power tool 100 includes the record and playback selector 985, the power tool 100 receives an indication from the record and playback selector 985 regarding the mode of the power tool 100. As shown in FIG. 25, during operation, the power tool 100 establishes a communication link with the external device 300 (step 900), exchanges identification and handshake information with the external device 300 to secure the communication link (step 905), and assigns the record and playback mode as a mode selectable by the power tool 100 (e.g., assign the record and playback mode to mode 1) at step 1027. The user then selects the record and playback mode using the mode selector switch 275 on the power tool 100 (step 1029). Then, the user utilizes the record and playback selector 985 to control when to switch the power tool 100 from the record-ing mode to the playback mode. The LEDs 1010, 1015 illuminate the mode indicators 1020, 1025, or indicators 1020, 1025 are illuminated, to indicate to the operator the currently selected operating mode of the motor 170.

As shown in FIG. 25, at step 1030, while the power tool 100 operates in the record and playback mode, the electronic processor 180 receives a user selection via the record and playback selector 985. The user selection being indicative of the recording mode. The record and playback selector 985 sends a first mode signal to the electronic processor 180 when the user selects the recording mode (step 1035). The user then selects a FORWARD direction, a REVERSE direction, or NEUTRAL using the direction switch 210. The direction switch 210 sends a direction signal to the electronic processor 180. The electronic processor 180 then operates the motor 170 according to the trigger activation and records the desired motor parameter as described above (step 1040). In the embodiment of FIG. 25, the recording session starts as soon as the power tool 100 enters the recording mode. When the user wishes to end the recording session and exit the recording mode, the user selects the playback mode using the record and playback selector 985. The electronic processor 180 receives the user selection indicative of the playback mode through the record and playback selector 985 (step 1045). The record and playback selector 985 sends a second mode signal to the electronic processor 180 when the user selects the playback mode (step 1050). Once the electronic processor 180 determines that the power tool 100 is in the playback mode (step 1053), the electronic processor 180 controls the motor 170 according to the recorded motor parameter (step 1055). Once the recording mode ends (i.e., in response to actuation of the record and playback selector 985), the wireless communication controller 330 transmits the recorded motor parameter to the external device 300 for storage (step 1060). In such embodiments, the user can select when the recording mode is established and when the recording mode ends to allow playback of the recorded motor parameter.

When the wireless communication controller 330 transmits the recorded motor parameter signal 720 to the external device 300, the external device 300 stores the recorded motor operation (e.g., the recorded motor parameter signal 720) as a new mode profile and can assign the mode profile to one of the modes as described with respect to FIG. 21.

Figure 26:
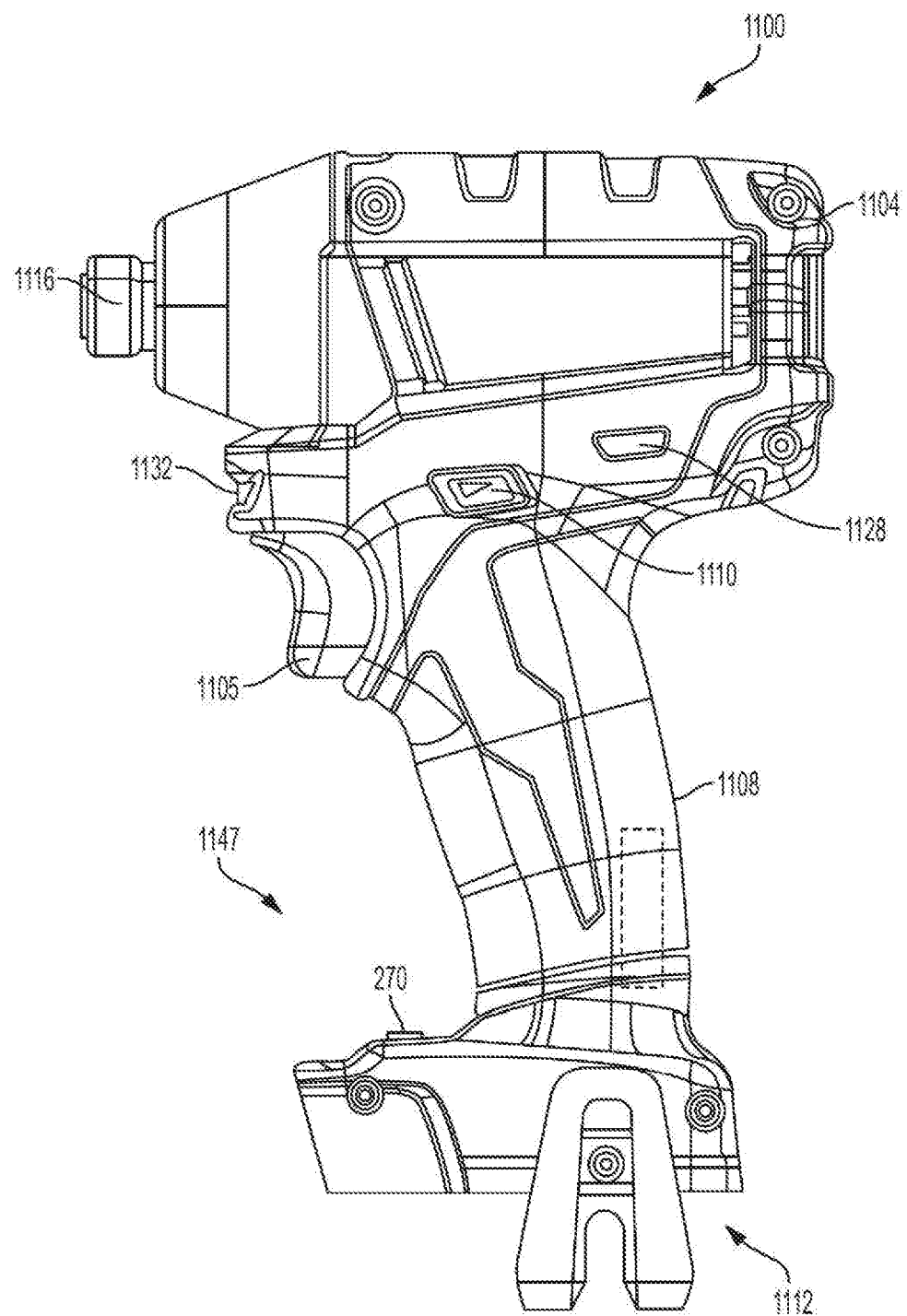
FIG. 26 is a side view of the tool according to another embodiment of the invention.

FIG. 26 illustrates a cordless, hand-held impact wrench 1100 including the mode pad 270. The impact wrench 1100 includes an upper main body 1104, a handle portion 1108, a battery pack receiving portion 1112, the mode pad 270, an output drive device or mechanism 1116, a forward/reverse selection button 210, a trigger 205, and air vents 1128. The impact wrench 1100 also includes a worklight 1132. The battery pack receiving portion 1112 receives a slide-on battery pack (not shown). The outer portions or housing of the impact wrench 1100 (e.g., the main body 1104 and the handle portion 1108) are composed of a durable and lightweight plastic material. The drive mechanism 1116 is composed of a metal (e.g., steel) as is known in the art.

Figure 27:
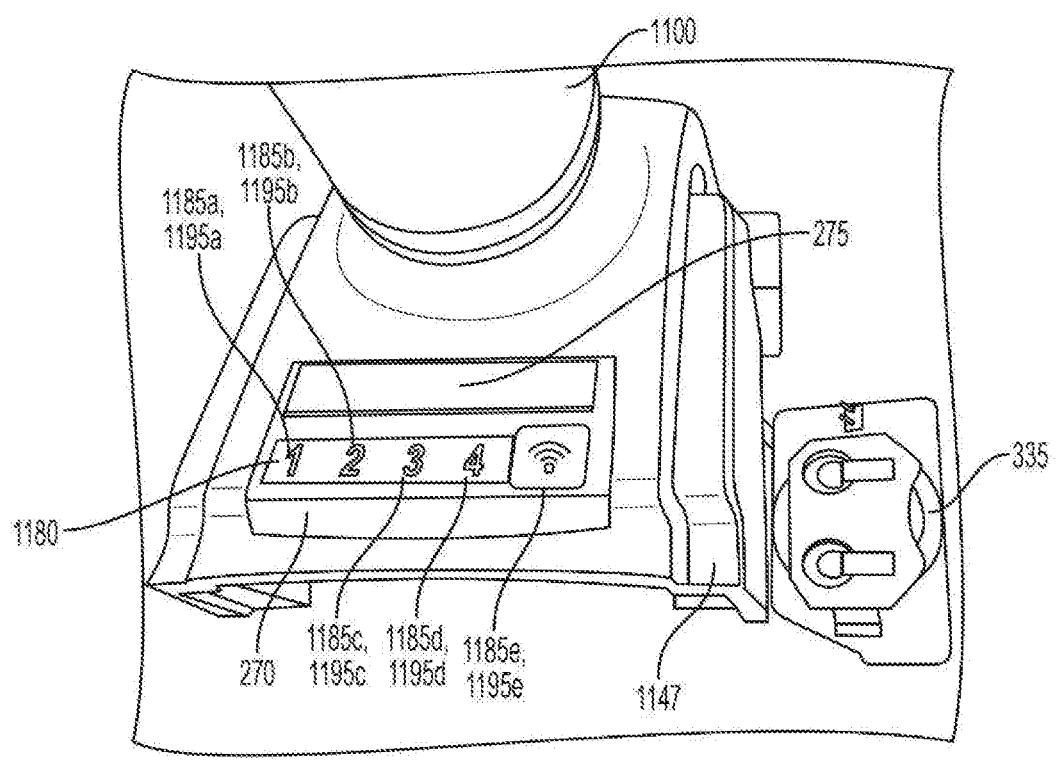
FIG. 27 illustrated a mode pad of the power tool shown in FIG. 1.

As shown in FIG. 27, the power tool 1100 includes the mode pad 270. The mode pad 270 is a user interface on the foot 1147 of the power tool 100. The mode pad 270 includes a mode selection switch 275 and mode indicator LEDs block 1180 having mode indicators 1185*a-e*. Each mode indicator 1185*a-e* includes one of the LEDs 337*a-e* (see FIG. 6) and an associated one of indicating symbols 1195*a-e* (e.g., "1", "2", "3", "4", and a radio wave symbol). When an LED 337 is enabled, the associated indicating symbol 1195 is illuminated. For instance, when LED 337*a* is enabled, the "1" (indicating symbol 1195*a*) is illuminated.

In the illustrated embodiment, the power tool 1100 has five selectable modes (one, two, three, for, and adaptive), each associated with a different one of the mode indicators 1185*a-e*. the mode selection switch 275 is a pushbutton that cycles through the five selectable modes upon each press (e.g., mode 1, 2, 3, 4, 5, 1, 2, and so on). The adaptive mode is represented by the indicating symbol 1195*e* (the radio wave symbol). In the adaptive mode, the user is able to configure the power tool 1100 via an external device 300, as is described above. In other embodiments, the power tool 1100 has more or fewer modes, and the mode selection switch 275 may be a different type of switch such as, for example, a slide switch and/or a rotary switch.

One of skill in the art will recognize that embodiments of the invention may be incorporated into tools such as power drills, impact drivers, power saws, angle drivers, and other tools incorporating a user-activated trigger mechanism. One skilled in the art will also recognize that the trigger activation signals, while illustrated as being discrete steps, are merely examples and that other continuous types of trigger activation signals are contemplated herein.

Thus, the invention provides, among other things, a power tool configured to enter a recording mode via an external device, record a motor parameter, and transmit the recorded motor parameter to the external device. Various features and advantages of the invention are set forth in the following claims.

What is claimed is:

1. A method for controlling a power tool with pre-recorded motor parameters, the method comprising:
    receiving, by an electronic processor of a server system, via a communication interface, a mode profile and a mode profile name, the mode profile including a pre-recorded motor parameter recorded by a first power tool during an operation of the first power tool and based on an output from a sensor of the first power tool;
    storing, in a memory of the server system, the mode profile and the mode profile name in a mode profile bank of the memory;
    receiving, via the communication interface, a request for the mode profile;
    retrieving the mode profile from the mode profile bank based on the request; and
    transmitting, via the communication interface, the mode profile in response to the request, the mode profile being configured to be transmitted to a second power tool that is configurable to replicate the operation of the first power tool by playing-back the pre-recorded motor parameter.

2. The method of claim 1, wherein the mode profile and the mode profile name are received, via the communication interface, from a first external user device or from the first power tool.

3. The method of claim 2, wherein the mode profile is transmitted, via the communication interface, to the second power tool directly or via the first external user device or a second external user device.

4. The method of claim 2, wherein the mode profile is transmitted, via the communication interface, to the first power tool.

5. The method of claim 1, wherein the mode profile includes configuration data that defines the operation of the first power tool.

6. The method of claim 1, wherein the mode profile specifies at least one of a motor speed of the first power tool, when to stop a motor of the first power tool, duration of a work light of the first power tool, intensity of the work light of the first power tool, or other operational characteristics.

7. The method of claim 1, wherein the request is a user request received from a mobile application of an external user device based on input received via a graphical user interface of the external user device.

8. A server system for controlling a power tool with pre-recorded motor parameters, the server system comprising:
    a communication interface;
    an electronic processor coupled to the communication interface; and
    a memory coupled to the electronic processor, the memory storing instructions that, when executed by the electronic processor, configure the electronic processor to
      receive, via the communication interface, a mode profile and a mode profile name, wherein the mode profile includes a pre-recorded motor parameter recorded by a first power tool during an operation of the first power tool and based on an output from a sensor of the first power tool;
      store, in the memory, the mode profile and the mode profile name in a mode profile bank of the memory;
      receive, via the communication interface, a request for the mode profile;
      retrieve the mode profile from the mode profile bank based on the request; and
      transmit, via the communication interface, the mode profile in response to the request, wherein the mode profile is configured to be transmitted to a second power tool that is configurable to replicate the operation of the first power tool by playing-back the pre-recorded motor parameter.

9. The server system of claim 8, wherein the mode profile and the mode profile name are received from a first external user device or from the first power tool.

10. The server system of claim 9, wherein the mode profile is transmitted to the second power tool directly or via the first external user device or a second external user device.

11. The server system of claim 9, wherein the mode profile is transmitted to the first power tool.

12. The server system of claim 8, wherein the mode profile includes configuration data that defines the operation of the first power tool.

13. The server system of claim 8, wherein the mode profile specifies at least one of a motor speed of the first power tool, when to stop a motor of the first power tool, duration of a work light of the first power tool, intensity of the work light of the first power tool, or other operational characteristics.

14. The server system of claim 8, wherein the request is a user request received from a mobile application of an external user device based on input received via a graphical user interface of the external user device.

15. A system for controlling a power tool with pre-recorded motor parameters, the system comprising:
    a first power tool including
      a motor,
      a sensor coupled to the motor and configured to measure a parameter of the motor,
      a wireless transceiver; and
      a first electronic processor coupled to the first motor and the sensor, the first electronic processor configured to receive a command to start a recording mode,
generate a recorded motor parameter by recording the parameter measured by the sensor during an operation of the motor and while the power tool is in the recording mode, and
transmit the recorded motor parameter via the wireless transceiver; and a server including
  a communication interface;
  a second electronic processor coupled to the communication interface; and
  a memory coupled to the second electronic processor, the memory storing instructions that, when executed by the second electronic processor, configure the second electronic processor to
    receive, via the communication interface, a mode profile and a mode profile name, wherein the mode profile includes the recorded motor parameter generated by the first power tool;
    store, in the memory, the mode profile and the mode profile name in a mode profile bank of the memory;
    receive, via the communication interface, a request for the mode profile;
    retrieve the mode profile from the mode profile bank based on the request; and
    transmit, via the communication interface, the mode profile in response to the request, wherein the mode profile is configured to be transmitted to a second power tool that is configurable to replicate the operation of the first power tool by playing-back the recorded motor parameter.

16. The system of claim 15, wherein the mode profile and the mode profile name are received from a first external user device or from the first power tool.

17. The system of claim 16, wherein the mode profile is transmitted to the second power tool directly or via the first external user device or a second external user device.

18. The system of claim 16, wherein the mode profile is transmitted to the first power tool.

19. The system of claim 15, wherein the mode profile includes configuration data that defines the operation of the first power tool.

20. The system of claim 15, wherein the mode profile specifies at least one of a motor speed of the first power tool, when to stop the motor of the first power tool, duration of a work light of the first power tool, intensity of the work light of the first power tool, or other operational characteristics.

* * * * *